US009557465B2

(12) United States Patent
Kadoriku et al.

(10) Patent No.: US 9,557,465 B2
(45) Date of Patent: Jan. 31, 2017

(54) ILLUMINATOR

(71) Applicant: PANASONIC INTELLECTUAL PROPERTY MANAGEMENT CO., LTD., Osaka (JP)

(72) Inventors: Shinji Kadoriku, Osaka (JP); Ryoma Murase, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 13 days.

(21) Appl. No.: 14/763,269

(22) PCT Filed: Mar. 20, 2014

(86) PCT No.: PCT/JP2014/001607
§ 371 (c)(1),
(2) Date: Jul. 24, 2015

(87) PCT Pub. No.: WO2014/188644
PCT Pub. Date: Nov. 27, 2014

(65) Prior Publication Data
US 2015/0346413 A1 Dec. 3, 2015

(30) Foreign Application Priority Data
May 21, 2013 (JP) .................................. 2013-106755

(51) Int. Cl.
*F21V 8/00* (2006.01)
*F21S 8/04* (2006.01)
(Continued)

(52) U.S. Cl.
CPC ............. *G02B 6/0016* (2013.01); *F21S 8/04* (2013.01); *G02B 6/0001* (2013.01);
(Continued)

(58) Field of Classification Search
CPC ...... F21V 5/005; F21V 7/0091; G02B 6/0011; G02B 6/0013; G02B 6/0018; G02B 6/0036; G02B 6/0038; G02B 6/0046; G02B 6/0073; G02B 6/0016; G02B 6/0051
See application file for complete search history.

(56) References Cited

U.S. PATENT DOCUMENTS 6,097,549 A * 8/2000 Jenkins .................. B60Q 1/302
359/726
6,183,099 B1 2/2001 Garay et al.
(Continued)

FOREIGN PATENT DOCUMENTS

| JP | 2010-245005 | 10/2010 |
|----|-------------|---------|
| JP | 2012-084316 | 4/2012 |

(Continued)

OTHER PUBLICATIONS

Search Report issued by E.P.O. patent office in E.P.O. Patent Application No. 14800455.9, dated Mar. 9, 2016.
(Continued)

*Primary Examiner* — Hargobind S Sawhney
(74) *Attorney, Agent, or Firm* — Greenblum & Bernstein, P.L.C.

(57) ABSTRACT

A light guide plate includes: an annular part formed in an annular shape along an element array of multiple light emitting elements; and an annular inner part formed on an annular inside of the annular part continuously with the annular part. The annular part includes: an element array-facing part which is a part facing the element array and which has an incident surface to allow light emitted from the light emitting elements to enter; and a first reflecting part which is a part located closer to the annular inner part than the element array-facing part, and which has a reflecting surface for reflecting the light entering from the incident
(Continued)

surface toward the annular inner part. The first reflecting part includes a first light scattering region having a light scattering treatment applied thereto.

14 Claims, 19 Drawing Sheets

(51) Int. Cl.
*F21S 8/02* (2006.01)
*F21Y 105/00* (2016.01)
*F21Y 101/00* (2016.01)

(52) U.S. Cl.
CPC .............. *G02B 6/0045* (2013.01); *F21S 8/02* (2013.01); *F21V 2200/00* (2015.01); *F21Y 2101/00* (2013.01); *F21Y 2105/00* (2013.01)

(56) References Cited

U.S. PATENT DOCUMENTS

| | | | | |
|---|---|---|---|---|
| 6,356,394 B1* | 3/2002 | Glienicke | ............. | B60Q 3/044 359/641 |
| 6,473,554 B1 | 10/2002 | Pelka et al. | | |
| 6,647,199 B1 | 11/2003 | Pelka et al. | | |
| 7,021,805 B2* | 4/2006 | Amano | ................. | F21S 48/215 362/307 |
| 7,160,010 B1* | 1/2007 | Chinniah | .............. | F21S 48/215 362/511 |
| 7,334,933 B1* | 2/2008 | Simon | ................. | F21V 7/0091 362/328 |
| 7,458,714 B2* | 12/2008 | Chang | ................. | G02B 6/0021 362/244 |
| 7,585,083 B2* | 9/2009 | Kim | ..................... | G02B 6/0018 362/245 |
| 7,942,560 B2* | 5/2011 | Holder | ................. | B60Q 1/2611 362/297 |
| 8,616,746 B2* | 12/2013 | Shinohara | ............. | G02B 6/0018 362/560 |
| 8,657,479 B2* | 2/2014 | Morgan | ................... | G02B 6/26 349/65 |
| 8,696,173 B2* | 4/2014 | Urtiga | ..................... | F21V 5/045 362/276 |
| 8,885,995 B2* | 11/2014 | Morgan | .............. | H01L 31/0525 385/33 |
| 9,075,172 B2* | 7/2015 | Koh | ...................... | G02B 6/0021 |
| 9,335,530 B2* | 5/2016 | Morgan | ................... | F21S 11/00 |
| 9,337,373 B2* | 5/2016 | Morgan | ................... | H01L 31/18 |
| 2006/0126343 A1* | 6/2006 | Hsieh | ........................ | F21K 9/00 362/327 |
| 2008/0055931 A1* | 3/2008 | Verstraete | ............ | G02B 6/0068 362/612 |
| 2010/0073960 A1* | 3/2010 | Yang | .................. | A47G 19/2227 362/612 |
| 2011/0249214 A1* | 10/2011 | Cheong | .................. | G02B 6/002 349/61 |
| 2012/0069579 A1 | 3/2012 | Koh et al. | | |

FOREIGN PATENT DOCUMENTS

| | | |
|---|---|---|
| JP | 2012-104476 | 5/2012 |
| WO | 98/26212 | 6/1998 |

OTHER PUBLICATIONS

Search Report issued by PCT patent office in Patent Application No. PCT/JP2014/001607, dated Jun. 10, 2014.

* cited by examiner

ILLUMINATOR

TECHNICAL FIELD

The present invention relates to an illumination device having light emitting elements such as LEDs (Light Emitting Diodes) as a light source, and particularly relates to a technology for reducing luminance unevenness in an illumination device for surface emission using a light guide plate.

BACKGROUND ART

An example of an illumination device for surface emission using a light guide plate is an edge light type illumination device 800 as shown in FIG. 18 (refer to Patent Document 1). FIG. 18 shows a plan view of the illumination device 800. In the illumination device 800, multiple light emitting elements 822 are annularly arranged around an outer periphery of a light guide plate 840 with their respective main emission directions directed to the light guide plate 840. Light emitted from the light emitting elements 822 enters the light guide plate 840 from an incident surface 840c which is an outer peripheral surface of the light guide plate 840, and is emitted uniformly from a light emitting surface 840a which is a front side surface of the light guide plate 840. A frame member 870 is attached to an outer periphery of the light guide plate 840 so as to cover the light emitting elements 822, whereby improvements in the protection of the light emitting elements 822 and the design of the illumination device 800 are achieved by the frame member 870.

However, if the frame member 870 is attached to the outer periphery of the light guide plate 840, the frame member 870 blocks light emitted from the outer periphery of the light guide plate 840, so that it is difficult to achieve emission from the entire surface on the front side of the illumination device 800.

Another example of an illumination device for surface emission using a light guide plate is a direct type illumination device 900 as shown in FIG. 19 (refer to Patent Document 2). FIG. 19 shows a cross-sectional view of the illumination device 900 while attached to a ceiling surface. In the illumination device 900, multiple light emitting elements 922 are annularly arranged on the back side of a light guide plate 940 with the main emission directions of the respective light emitting elements 922 directed to the light guide plate 940. Light emitted from the light emitting elements 922 enters an annular part 941 of the light guide plate 940 from an incident surface 944b formed on the back side of the annular part 941, and is reflected by a reflecting surface 941a as a front side surface of the annular part 941, and is further guided into an annular inner part 942 and an annular outer part 943 of the light guide plate 940. Then, this light is emitted uniformly from light emitting surfaces 942a, 943a which are front side surfaces of the annular inner part 942 and the annular outer part 943.

The arrangement of the light emitting elements 922 on the back side of the light guide plate 940, as in the illumination device 900, makes it unnecessary to attach a frame member to an outer periphery of the light guide plate 940, preventing the light emitted from the outer periphery of the light guide plate 940 from being blocked by the frame member, thus making it possible to achieve entire surface emission from the front side of the illumination device 900.

RELATED ART DOCUMENTS

Patent Documents

[Patent Document 1] Japanese Laid-open Patent Publication 2012-84316
[Patent Document 2] Japanese Laid-open Patent Publication 2012-104476

SUMMARY OF THE INVENTION

Problem to be Solved by the Invention

However, the structure such as the illumination device 900 of FIG. 19 causes shadow regions in the reflecting surface 941a of the annular part 941 of the light guide plate 940 from which almost no light is emitted, and thus the shadow regions cause luminance unevenness in the illumination device 900. More specifically, the reflecting surface 941a of the annular part 941 is formed to almost totally reflect light to effectively guide the light to the annular inner part 942 and the annular outer part 943, so that except for the regions of the reflecting surface 941a where there are the light emitting elements 922 on the back side thereof, almost no light is emitted from the front side thereof. Thus, the regions of the reflecting surface 941a, except where there are the light emitting elements 922, become shadow regions, and the shadow regions cause luminance unevenness.

In view of the above problems, an object of the present invention is to provide an illumination device which can achieve emission from the entire surface on the front side thereof with little luminance unevenness.

Means to Solve the Problem

In order to achieve the above object, an illumination device of the present invention comprises a light guide plate having multiple light emitting elements annularly arranged on a back side thereof with their respective main emission directions directed to the light guide plate, wherein the light guide plate comprises: an annular part formed in an annular shape along an element array of the multiple light emitting elements; and an annular inner part formed on an annular inside of the annular part continuously with the annular part, wherein the annular part comprises: an element array-facing part which is a part facing the element array and which has an incident surface to allow light emitted from the light emitting elements to enter; and an inner reflecting part which is a part located closer to the annular inner part than the element array-facing part and which has a reflecting surface for reflecting the light entering from the incident surface toward the annular inner part, and wherein the inner reflecting part comprises a first light scattering region having a light scattering treatment applied thereto.

According to the illumination device of the present invention, multiple light emitting elements are annularly arranged on the back side of the light guide plate, so that it is not necessary to attach a frame member to an outer periphery of the light guide plate to cover and hide the multiple light emitting elements. Thus, according to this illumination device, light emitted from the outer periphery of the light guide plate is prevented from being blocked by the frame member, making it possible to achieve entire surface emission from the front side thereof. In addition, according to the illumination device of the present invention, the inner reflecting part for reflecting light entering from the incident surface toward the annular inner part comprises the first light scattering region, so that a part of the light reaching the inner reflecting part is scattered by the first light scattering region and emitted to the outside of the annular part, making it difficult for shadow areas to be generated in the annular part. Thus, according to the illumination device of the present invention, the luminance unevenness can be reduced as compared with a conventional illumination device as shown in Patent Document 2.

Preferably, the light scattering treatment applied to the first light scattering region is to provide recesses and/or projections in the reflecting surface of the inner reflecting part.

The number of the recesses and/or projections per unit area in the reflecting surface of the first light scattering region may increase as they get farther from the light emitting elements.

The number of the recesses and/or projections per unit area in the reflecting surface of the first light scattering region may increase as deviation angles of the recesses and/or projections relative to axes of the light emitting elements increase.

Preferably, an area occupation ratio of the recesses and/or projections in the reflecting surface of the first light scattering region increases as they get farther from the light emitting elements.

Preferably, an area occupation ratio of the recesses and/or projections in the reflecting surface of the first light scattering region increases as deviation angles of the recesses and/or projections relative to axes of the light emitting elements increase.

The light guide plate may further comprise an annular outer part formed on an annular outside of the annular part continuously with the annular part, wherein the annular part further may comprise an outer reflecting part which is a part located closer to the annular outer part than the element array-facing part and which has a reflecting surface for reflecting the light entering from the incident surface toward the annular outer part, and wherein the outer reflecting part may comprise a second light scattering region having a light scattering treatment applied thereto.

Preferably, the light scattering treatment applied to the second light scattering region is to provide recesses and/or projections in a reflecting surface of the outer reflecting part.

The number of the recesses and/or projections per unit area in the reflecting surface of the second light scattering region may increase as they get farther from the light emitting elements.

The number of the recesses and/or projections per unit area in the reflecting surface of the second light scattering region may increase as deviation angles of the recesses and/or projections relative to axes of the light emitting elements increase.

Preferably, an area occupation ratio of the recesses and/or projections in the reflecting surface of the second light scattering region increases as they get farther from the light emitting elements.

Preferably, an area occupation ratio of the recesses and/or projections in the reflecting surface of the second light scattering region increases as deviation angles of the recesses and/or projections relative to axes of the light emitting elements increase.

Preferably, the inner annular part comprises a third light scattering region having a light scattering treatment applied thereto, while recesses and/or projections are provided in the third light scattering region, wherein an area occupation ratio of the recesses and/or projections in the first light scattering region and the third light scattering region has a tendency to increase from the first light scattering region toward the third light scattering region.

In the increase in the area occupation ratio of the recesses and/or projections from the first light scattering region toward the third light scattering region, there may be a discontinuity between the first light scattering region and the third light scattering region.

DESCRIPTION OF EMBODIMENTS

Figure 1:
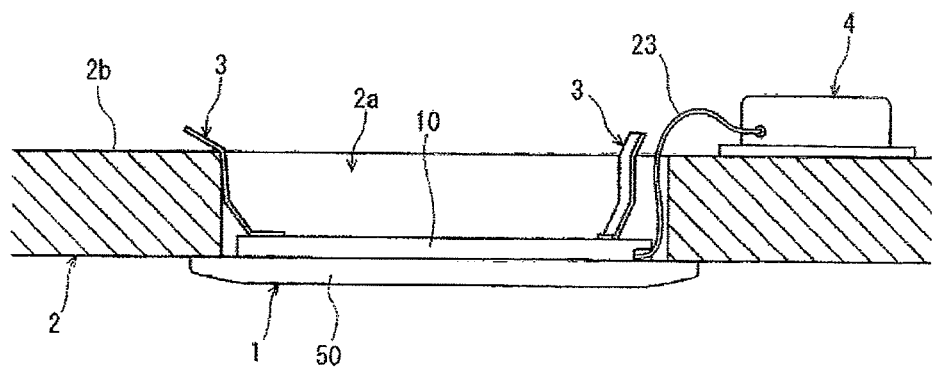
FIG. 1 is a view for explaining a mode of attaching an illumination device according to a first embodiment of the present invention to a ceiling plate.

Hereinafter, an illumination device according to an aspect of the present invention will be described with reference to the drawings. Note that the scale of the components in the drawings is different from that of actual ones. Further, in the present application, the symbol "-", which is used to indicate a numerical value range, includes the numerical values at both extremes.

<First Embodiment>
(Overall Structure)

FIG. 1 is a view for explaining a mode of attaching an illumination device according to a first embodiment of the present invention to a ceiling plate. As shown in FIG. 1, the illumination device 1 according to an aspect of the present invention is, for example, a down light embedded in and attached to a ceiling plate 2. Note that the illumination device 1 according to the present invention is not limited to a down light, and can be an illumination device for a building other than the down light, such as a ceiling light, and can also be an illumination device other than the illumination device for a building such as a back light.

The illumination device 1 is attached to the ceiling plate 2 by inserting a part of a housing 10 into a through-hole 2a formed in the ceiling plate 2, and by allowing a leaf spring-like hook member 3 attached to the housing 10 to be hooked on a ceiling back surface 2b of the ceiling plate 2. Note that the hook member 3 is not limited to the leaf spring-like one. Further, the method of attaching the illumination device 1 to the ceiling plate 2 is not limited to the one using the hook member 3, and it can be attached by screwing, bonding or the like.

A circuit unit 4 for turning on the illumination device 1 is provided on the ceiling back surface 2b of the ceiling plate 2, in which the illumination device 1 is electrically connected to the circuit unit 4 through a power supply wire 23. The circuit unit 4 is electrically connected to an external commercial AC power supply (not shown) to supply a current input from the commercial AC power supply to the illumination device 1. Note that in the present embodiment, the circuit unit 4 is required separately from the illumination device 1. However, the illumination device according to the present invention can be an illumination device with the circuit unit 4 built in. The illumination device 1 has, on a lower surface thereof, a diffusion cover 50 to cause light to diverge. The diffusion cover 50 will be described in detail later.

Figure 2:
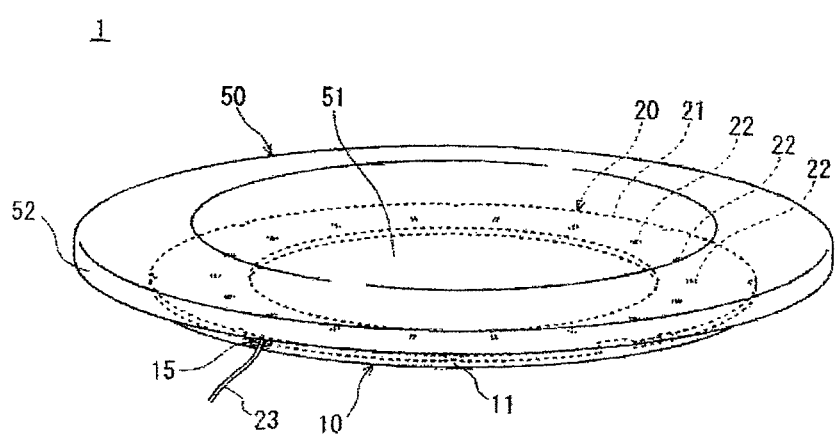
FIG. 2 is a perspective view of the illumination device.

FIG. 2 is a perspective view showing the illumination device 1 according to the first embodiment. The illumination device 1 is covered with the housing 10 and the diffusion cover 50, and comprises a light emitting module 20 therein, in which the light emitting module 20 comprises a substrate 21 of an annular plate shape and multiple light emitting elements 22 mounted on an element mounting surface 21a (refer to FIG. 3) of the substrate 21 as one major surface thereof. The housing 10 comprises a main body part 11 of a cylindrical shape with a bottom, which has a through-hole 15 formed in a side wall part thereof to allow the power supply wire 23 to pass through, while the light emitting module 20 is connected by the power supply wire 23 to the circuit unit 4 (refer to FIG. 1).

The diffusion cover 50 comprises a main body part 51 of a dome shape and a side wall part 52 extending from a peripheral portion of the main body part 51 toward its back side. Note that in the present specification, the side of the illumination device 1 from which light is directed is the front side, and the side opposite to the front side is the back side. In FIG. 2, the upper side of the drawing is the front side, while the lower side of the drawing is the back side. Similarly, in FIGS. 3 to 5 below, the upper side of the drawing is the front side, while the lower side of the drawing is the back side.

Figure 3:
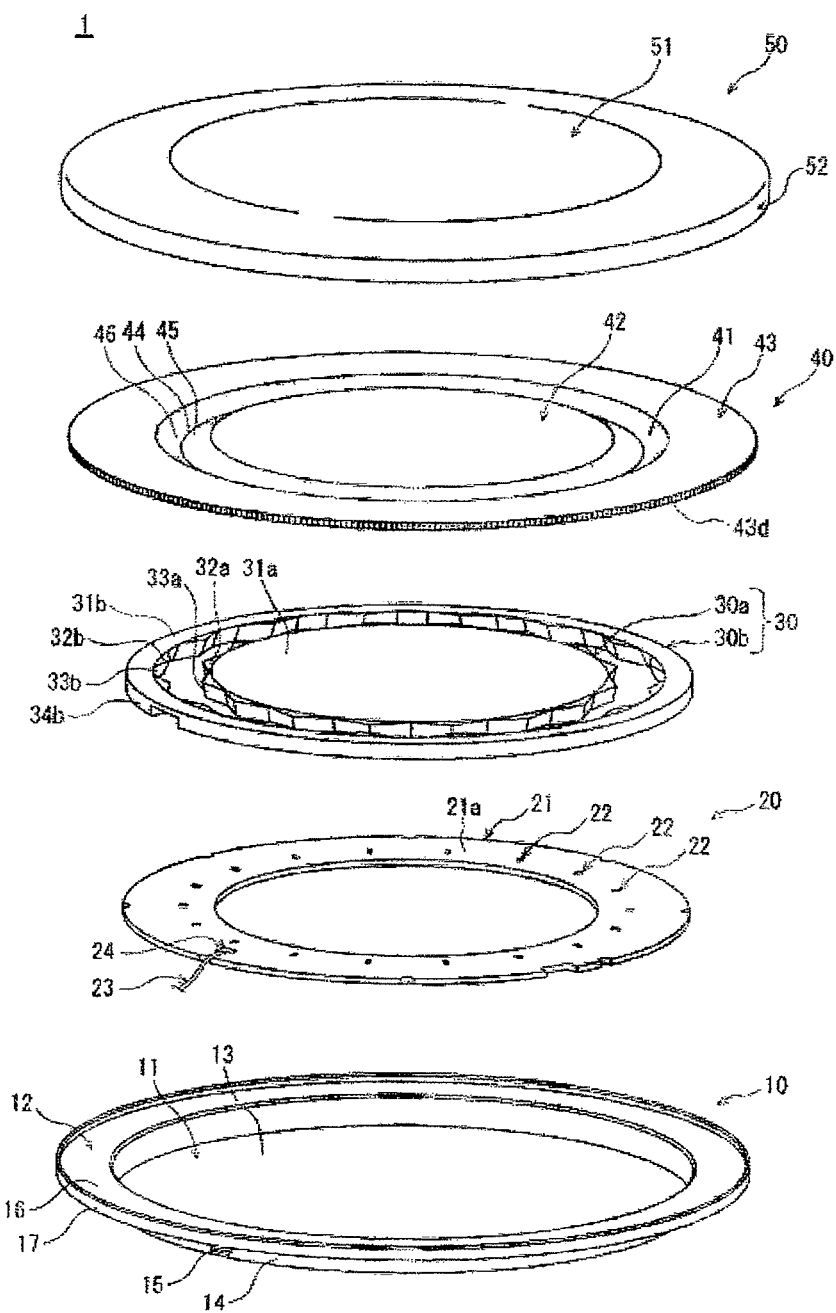
FIG. 3 is an exploded perspective view of the illumination device.

Next, the structure of the illumination device 1 will be described in detail using FIG. 3. FIG. 3 is an exploded perspective view showing the illumination device according to the first embodiment. The illumination device 1 comprises, for example, the housing 10, the light emitting module 20, a reflecting member 30, the light guide plate 40, the diffusion cover 50 and so on.

(Diffusion Cover 50)

As shown in FIG. 3, the diffusion cover 50 is formed, for example, of a transparent material such as silicone resin, acrylic resin, polycarbonate resin, glass or the like, and light emitted from the light guide plate 40 shown in FIG. 3 passes through the diffusion cover 50 and is taken to the outside of the illumination device 1.

The diffusion cover 50 comprises the main body part 51 of the dome shape to cover the light guide plate 40, and the side wall part 52 extending from the peripheral portion of the main body part 51 toward its back side, in which the side wall part 52 is fixed to a flange portion 17 of a collar part 12 of the housing 10 shown in FIG. 3. The main body part 51 has a light scattering treatment applied thereto, so that the light emitted from the light guide plate 40 becomes scattered light when it passes through the main body part 51. Thus, luminance unevenness is further reduced. Note that the diffusion cover is not a requisite for the illumination device according to the present invention.

(Light Guide Plate 40)

As shown in FIG. 3, the light guide plate 40 has a circular plate shape, and comprises: an annular part 41 formed in an annular shape along an element array of the multiple light emitting elements 22 mounted on the light emitting module 20; an annular inner part 42 of a circular plate shape which is formed on an annular inside of the annular part 41 continuously with the annular part 41; and an annular outer part 43 of an annular shape which is formed on an annular outside of the annular part 41 continuously with the annular part 41, that are shown in FIG. 3. These three of the annular part 41, the annular inner part 42 and the annular outer part 43 are integrally molded. Materials with good light guiding properties, such as acrylic resin, polycarbonate resin, polystyrene resin, glass and the like, are most suitable as materials of the light guide plate 40.

The annular part 41 comprises an element array-facing part 44, a first reflecting part 45 and a second reflecting part 46. The element array-facing part 44 is an annular part facing the element array of the multiple light emitting elements 22. The first reflecting part 45 is located on the annular inside of the element array-facing part 44, and has an annular shape along the element array-facing part 44. The first reflecting part 45 forms an inner reflecting part. The second reflecting part 46 is located on the annular outside of the element array-facing part 44, and is an annular part along the element array-facing part 44.

(Reflecting Member 30)

The reflecting member 30 of FIG. 3 comprises an inner reflecting member 30a of a circular plate shape, and an outer reflecting member 30b of an annular plate shape provided to surround an outer periphery of the inner reflecting member 30a. Materials with high reflectivity, such as highly reflective polybutylene terephthalate resin, highly reflective polycarbonate resin, highly reflective nylon resin, highly reflective foamed resin and the like, are most suitable as materials of the inner reflecting member 30a and the outer reflecting member 30b.

The inner reflecting member 30a has a front side surface which comprises a first light reflecting surface 31a, a second light reflecting surface 32a and an outer peripheral surface 33a. The outer reflecting member 30b has a front side surface which comprises a first light reflecting surface 31b, a second light reflecting surface 32b, an inner peripheral surface 33b and an outer peripheral surface 34b. The outer peripheral surface 33a of the inner reflecting member 30a and the inner peripheral surface 33b of the outer reflecting member 30b are arranged to face each other with a gap therebetween.

(Light Emitting Module 20)

In FIG. 3, the light emitting module 20 comprises the substrate 21 of the annular plate shape and the multiple light emitting elements 22 mounted on the element mounting surface 21a of the substrate 21 as one major surface thereof, and is arranged on the back side of the light guide plate 40. The respective light emitting elements 22 are annularly arranged on the element mounting surface 21a of the substrate 21 with their respective main emission directions directed to the light guide plate 40.

The substrate 21 has a two-layer structure comprising, for example, an insulating layer formed of a ceramic substrate, a thermally conductive resin or the like, and a metal layer formed of an aluminum plate or the like. The substrate 21 has a wiring pattern (not shown) formed thereon, while each light emitting element 22 is electrically connected to the power supply wire 23 through the wiring pattern and a connector 24. The element mounting surface 21a of the substrate 21 serves as a reflecting surface to efficiently reflect light toward the light guide plate 40.

The light emitting element 22 is, for example, an LED, and is mounted face up on the element mounting surface 21a of the substrate 21 using COB (Chip On Board) technology. Note that the light emitting element according to the present invention can be, for example, an LD (Laser Diode) or an EL element (Electroluminescence element). Further, the light emitting element according to the present invention can be of SMD (Surface Mount Device) type mounted on the substrate.

(Housing 10)

As shown in FIG. 3, the housing 10 has, for example, a dish shape made by aluminum die casting, and comprises the main body part 11 of the cylindrical shape with a bottom and the collar part 12 of an annular plate shape extending from an opening of the main body part 11.

Figure 4:
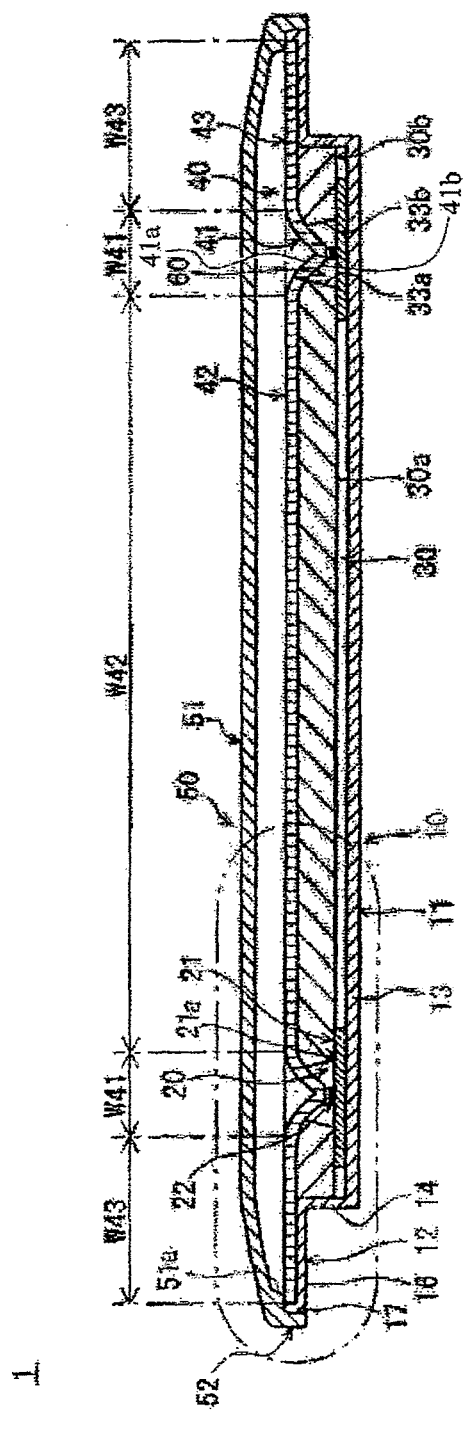
FIG. 4 is a cross-sectional view of the illumination device.

The main body part 11 comprises a bottom plate part 13 of a circular plate shape, and a cylindrical side wall part 14 extending from an outer periphery of the bottom plate part 13, while, as shown in FIG. 4, the light emitting module 20, the reflecting member 30 and a part of the light guide plate 40 are housed inside the main body part 11. Referring back to FIG. 3, the side wall part 14 of the main body part 11 has a through-hole 15 formed therein to allow the power supply wire 23 to pass through.

The collar part 12 comprises a main body part 16 of an annular plate shape in contact with the ceiling plate 2, and a flange portion 17 extending from an outer periphery of the main body part 16, while, as shown in FIG. 4, the housing 10 and the diffusion cover 50 are fixed together, e.g. by bonding or the like, with the side wall part 52 of the diffusion cover 50 fitted to the flange part 17 from outside.

Figure 5A:
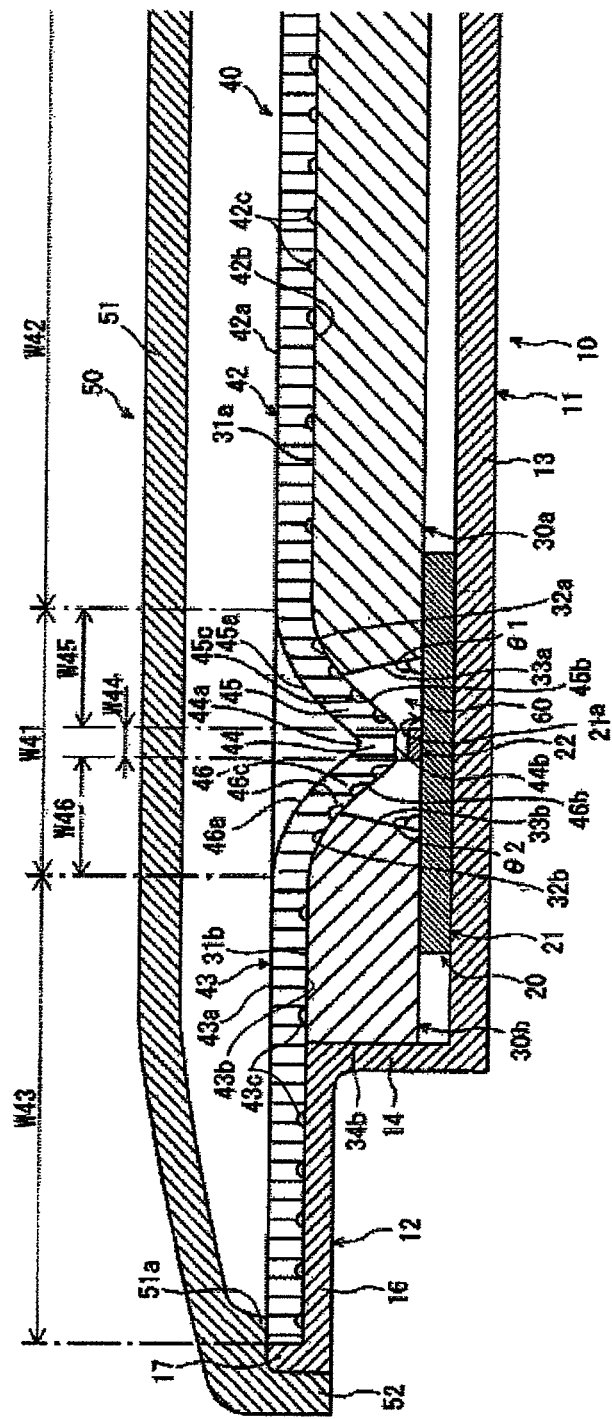
FIG. 5A is an enlarged cross-sectional view of a portion surrounded by a two-dot chain line shown in FIG. 4.

Next, the structure of the illumination device 1 will be described in more detail using FIG. 4 and FIG. 5A. FIG. 4 is a cross-sectional view showing the illumination device 1 according to the first embodiment. FIG. 5A is an enlarged cross-sectional view of a portion surrounded by a two-dot chain line shown in FIG. 4.

(Reflecting Member 30)

As shown in FIG. 4, the reflecting member 30 is arranged on the back side of the light guide plate 40 and close to the light guide plate 40. More specifically, the inner reflecting member 30a is arranged on the back side of the annular inner part 42 of the light guide plate 40, while the outer reflecting member 30b is arranged on the back side of the annular outer part 43 of the light guide plate 40, so that the reflecting member 30 as a whole is arranged on the back side of the light guide plate 40 so as to avoid the light emitting elements 22 (so as not to overlap the light emitting diodes 22).

The outer reflecting member 30b has an outer diameter substantially equal to an inner diameter of the main body part 11 of the housing 10, so that positioning of the outer reflecting member 30b is completed only by housing the outer reflecting member 30b in the main body part 11. Others will be described with reference to the enlarged view of FIG. 5A.

As shown in FIG. 5A, the front side surface of the inner reflecting member 30a comprises the first light reflecting surface 31a and the second light reflecting surface 32a. The first light reflecting surface 31a faces a back side surface 42b of the annular inner part 42 of the light guide plate 40 so as to serve to reflect light leaking from the annular inner part 42 to the back side and return it to the annular inner part 42. The second light reflecting surface 32a faces a first light scattering region 45b on the back side of the first reflecting part 45 of the annular part 41 of the light guide plate 40 so as to serve to reflect light leaking from the first reflecting part 45 to the back side and return it to the first reflecting part 45.

In the illumination device 1 according to the present embodiment, the first light reflecting surface 31a is in surface contact with the back side surface 42b of the annular inner part 42, while the second light reflecting surface 32a is in surface contact with the first light scattering region 45b on the back side of the first reflecting part 45, so that it is possible to diffuse and reflect light passing through many recesses 42c on the surface 42b, and to efficiently emit the light from the surface 42 of the light guide plate 40, and also possible to position the inner reflecting member 30a relative to the light guide plate 40 with high accuracy.

Note that the respective components in the illumination device according to the present invention are not necessarily in surface contact with one another, and it is possible that the first light reflecting surface 31a and the back side surface 42b of the annular inner part 42 have a space therebetween. In addition, the second light reflecting surface 32a and the first light scattering region 45b on the back side of the first reflecting part 45 can also have a space therebetween.

The front side surface of the outer reflecting member 30b comprises the first light reflecting surface 31b and the second light reflecting surface 32b. The first light reflecting surface 31b faces a back side surface 43b of the annular outer part 43 of the light guide plate 40 so as to serve to reflect light leaking from the annular outer part 43 to the back side and return it to the annular outer part 43. The second light reflecting surface 32*b* faces a second light scattering region 46*b* on the back side of the second reflecting part 46 of the annular part 41 of the light guide plate 40 so as to serve to reflect light leaking from the second reflecting part 46 to the back side and return it to the second reflecting part 46.

In the illumination device 1 according to the present embodiment, the first light reflecting surface 31*b* is in surface contact with the back side surface 43*b* of the annular outer part 43, while the second light reflecting surface 32*b* is in surface contact with the second light scattering region 46*b* on the back side of the second reflecting part 46, so that it is possible to efficiently return light to the light guide plate 40, and also possible to position the outer reflecting member 30*b* relative to the light guide plate 40 with high accuracy. Note that the respective components in the illumination device according to the present invention are not necessarily in surface contact with one another, and it is possible that the first light reflecting surface 31*b* and the back side surface 43*b* of the annular outer part 43 have a space therebetween. In addition, the second light reflecting surface 32*b* and the second light scattering region 46*b* on the back side of the second reflecting part 46 can also have a space therebetween.

As shown in FIG. 4, the inner reflecting member 30*a* and the outer reflecting member 30*b* are arranged such that the outer peripheral surface 33*a* of the inner reflecting member 30*a* and the inner peripheral surface 33*b* of the outer reflecting member 30*b* face each other on the back side of the light guide plate 40 with a space therebetween. Thus, the inner reflecting member 30*a* and the outer reflecting member 30*b* form an element housing groove 60 of an annular shape for housing the light emitting elements 22. The element housing groove 60 is a region on the back side of the annular part 41 of the light guide plate 40 where the inner reflecting member 30*a* and the outer reflecting member 30*b* are not present.

The element housing groove 60 has an inner peripheral surface which comprises the outer peripheral surface 33*a* of the inner reflecting member 30*a*, and the element housing groove 60 has an outer peripheral surface which comprises the inner peripheral surface 33*b* of the outer reflecting member 30*b*, while the element housing groove 60 has a bottom surface which comprises the element mounting surface 21*a* of the substrate 21. Further, as shown in FIG. 5A, the outer peripheral surface 33*a* of the inner reflecting member 30*a* and the element mounting surface 21*a* of the substrate 21 form an angle θ1 therebetween which is an acute angle. Further, the inner peripheral surface 33*b* of the outer reflecting member 30*b* and the element mounting surface 21*a* of the substrate 21 form an angle θ2 therebetween which is also an acute angle. Further, each of the outer peripheral surface 33*a* of the inner reflecting member 30*a* and the inner peripheral surface 33*b* of the outer reflecting member 30*b* is a light reflecting surface.

(Light Guide Plate 40)

The light guide plate 40 comprises: the annular part 41 formed in the annular shape along the element array of the multiple light emitting elements 22; the annular inner part 42 formed on the annular inside of the annular part 41 continuously with the annular part 41; and the annular outer part 43 formed on the annular outside of the annular part 41 continuously with the annular part 41. In FIG. 4 and FIG. 5A, the region indicated by the symbol W41 is the annular part 41, and the region indicated by the symbol W42 is the annular inner part 42, while the region indicated by the symbol W43 is the annular outer part 43. The annular outer part 43 has an outer peripheral portion which is positioned, while mounted on the main body part 16 of the collar part 12 of the housing 10, by being sandwiched between the main body part 16 and an outer peripheral portion 51*a* of the diffusion cover 50. Further, the annular part 41 comprises: the element array-facing part 44 which is a part facing the element array described above and which has an incident surface 44*b* to allow the light emitted from the light emitting elements 22 to enter; and the first reflecting part 45 (inner reflecting part) which is a part located closer to the annular inner part 42 than the element array-facing part 44, and which has a reflecting surface for reflecting the light entering from the incident surface 44*b* toward the annular inner part 42. The annular part 41 further comprises the second reflecting part 46 (outer reflecting part) which is a part located closer to the annular outer part 43 than the element array-facing part 44, and which has a reflecting surface for reflecting the light entering from the incident surface 44*b* toward the annular outer part 43. In FIG. 5A, the region indicated by the symbol W44 is the element array-facing part 44, and the region indicated by the symbol W45 is the first reflecting part 45, while the region indicated by the symbol W46 is the second reflecting part 46. The first reflecting part 45 (inner reflecting part) comprises the first light scattering region 45*b* having a light scattering treatment applied thereto, while the second reflecting part 46*b* (outer reflecting part) comprises the second light scattering region 46*b* having a light scattering treatment applied thereto.

As shown in FIG. 5A, the front side surface of the light guide plate 40 comprises a front side surface 41*a* (refer to FIG. 4) of the annular part 41, a front side surface 42*a* of the annular inner part 42, and a front side surface 43*a* of the annular outer part 43. Further, the front side surface 41*a* (refer to FIG. 4) of the annular part 41 comprises a front side surface 44*a* of the element array-facing part 44, a front side surface 45*a* of the first reflecting part (inner reflecting part), and a front side surface 46*a* of the second reflecting part (outer reflecting part). Each of the front side surface 45*a* of the first reflecting part and the front side surface 46*a* of the outer reflecting part is a reflecting surface.

Further, the back side surface of the light guide plate 40 comprises a back side surface 41*b* (refer to FIG. 4) of the annular part 41, a back side surface 42*b* of the annular inner part 42, and a back side surface 43*b* of the annular outer part 43. Further, the back side surface 41*b* (refer to FIG. 4) of the annular part 41 comprises: a back side surface 44*b* of the element array-facing part 44; the first light scattering region 45*b* on the back side of the first reflecting part 45; and the second light scattering region 46*b* on the back side of the second light reflecting part 46.

Note that the light guide plate 40 according to the present embodiment is not limited to the circular plate shape, and is arbitrary. For example, it can be a polygonal plate shape such as quadrangular plate shape, hexagonal plate shape, octagonal plate shape or the like. Further, the shape of each of the annular part, the annular inner part, the annular outer part, the element array-facing part, the first reflecting part and the second reflecting part is arbitrary depending on the shape of the light guide plate. Further, the arrangement of the light emitting elements 22 and the shape of the substrate are also arbitrary depending on the shape of the light guide plate.

The front side surface 41a (refer to FIG. 4) of the annular part 41 is a reflecting surface for reflecting the light of the light emitting elements 22, which enters the annular part 41 from the back side, toward the annular inner part 42 or the annular outer part 43. In a longitudinal cross-section of the light guide plate 40 shown in FIG. 4 (cross-section cut by a virtual plane passing through a center of the front side surface of the light guide plate 40 and perpendicular to the front side surface of the light guide plate 40), the shape of the front side surface 41a of the annular part 41 is a substantially V-shape which is bent so that its center projects to the back side. The bent portion has a round shape protruding toward the back side. Both sides (the first reflecting part 45 and the second reflecting part 46) of the bent portion each have a substantially arc shape protruding toward the front side in order to efficiently reflect light toward the annular inner part 42 and the annular outer part 43.

The back side surface 41b (refer to FIG. 4) of the annular part 41 has a light scattering treatment applied thereto. More specifically, as shown in FIG. 5A, recesses 45c, 46c are provided in the first light scattering region 45b and the second light scattering region 46b as a light scattering treatment. Due to the application of the light scattering treatment, the light emitted diagonally from the light emitting elements 22 and reaching the first light scattering region 45b and the second light scattering region 46b through the light incident surface 44b is not totally reflected, and a part of it is scattered by the recesses 45c, 46c and emitted to the outside of the light guide plate 40.

In the present embodiment, the recesses 45c, 46c each have a substantially hemispherical shape, and all have the same size. Note that the shape, the size and the like of the recesses according to the present invention are arbitrary if they have a light scattering effect, in which the shape can be, for example, a substantially cone shape, a substantially truncated cone shape or the like.

Figure 6A:
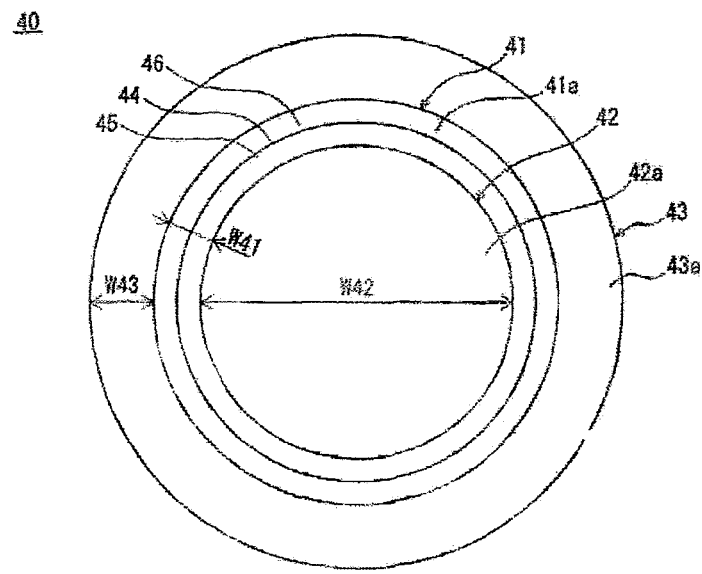
FIG. 6A is a plan view of the light guide plate of the illumination device as seen from the front side.
Figure 6B:
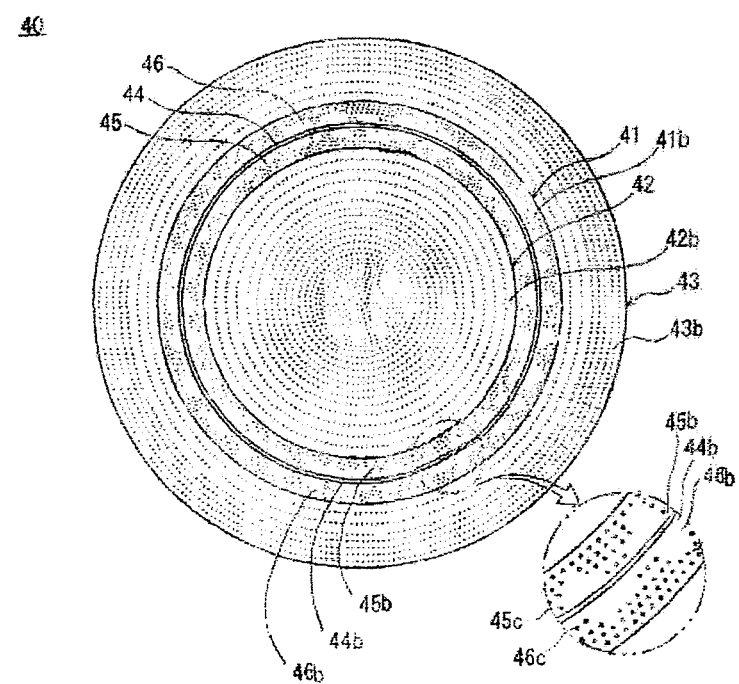
FIG. 6B is a plan view of the light guide plate of the illumination device as seen from the back side.

FIG. 6A is a plan view of the light guide plate 40 according to the first embodiment as seen from the front side, while FIG. 6B is a plan view of the light guide plate 40 as seen from the back side.

Note that the first light scattering region 45b and the second light scattering region 46 according to the present embodiment have the same mode of light scattering treatment applied thereto. More specifically, the first light scattering region 45b and the second light scattering region 46 have the same number of recesses 45c, 46c (refer to FIG. 5A) per unit area.

Referring back to FIG. 5A, a part of the back side surface (corresponding to the first light scattering region 45b and the second light scattering region 46b) of the annular part 41 is an incident surface to allow the light of the light emitting elements 22 to enter. The back side surface 44b of the element array-facing part 44 corresponds to the incident surface. The back side surface 44b has an annular shape facing the element array of the multiple light emitting elements 22. Further, the entire back side surface of the annular part 41 also serves as an incident surface to allow the light reflected by the element mounting surface 21a of the substrate 21 in the element housing groove 60 to enter the annular part 41.

The front side surface 42a of the annular inner part 42 is a light emitting surface to allow a part of the light entering the annular inner part 42 to be emitted therefrom. The front side surface 43a of the annular outer part 43 is a light emitting surface to allow a part of the light entering the annular outer part 43 to be emitted therefrom.

The recesses 42c are provided in the back side surface 42b (claimed "third light scattering region") of the annular inner part 42 as a light scattering treatment. In other words, the annular inner part 42 comprises the surface 42b (third light scattering region) having the light scattering treatment applied thereto. Thus, the light entering the recesses 42c in the annular inner part 42 becomes scattered light, and is emitted from the front side surface 42a. As shown in FIG. 5A, the number of recesses 42c per unit area increases as they get closer to the center of the back side surface 42b of the annular inner part 42, thereby allowing light to be emitted uniformly from the front side surface 42a in its entirety.

It is also possible to adjust an area density of the recesses 42c per unit area by adjusting depth of the recesses 42c to change their area, with the recesses 42c provided at equal pitches.

The recesses 43c are provided in the back side surface 43b of the annular outer part 43 as a light scattering treatment. Thus, the light entering the recesses 43c in the annular outer part 43 becomes scattered light, and is emitted from the front side surface 43a. The number of recesses 43c per unit area increases as they get closer to the outer periphery of the back side surface 43b of the annular outer part 43, thereby allowing light to be emitted uniformly from the front side surface 43a in its entirety. Like the recesses 42c, it is also possible to adjust an area density of the recesses 43c per unit area by adjusting depth of the recesses 43c to change their area, with the recesses 43c provided at equal pitches.

Figure 5B:
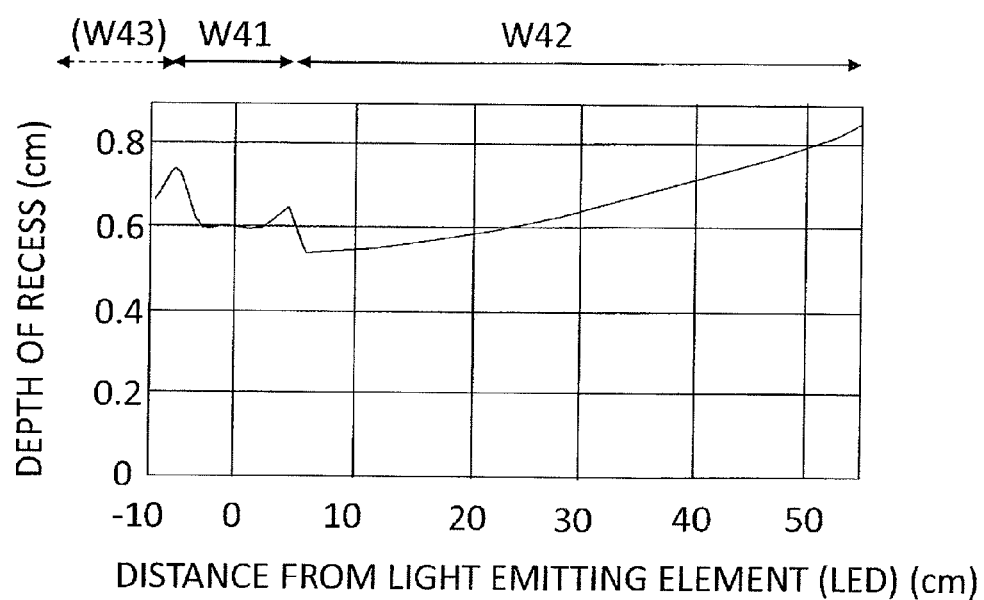
FIG. 5B is a graph showing a relationship between depths of recesses in a light guide plate and distances of the recesses from light emitting elements of the illumination device.

Here, what is shown in FIG. 5B can be used, for example, to allow the recesses 43c, 42c, 46c, 45c to have the same pitches. FIG. 5B shows a relationship between depths of the recesses 43c, 42c, 46c, 45c and distances of these recesses from the light emitting elements (LED) 22. As shown in FIG. 5B, the depths of the recesses change discontinuously at a boundary between the region of the annular part W41 and neighboring regions, causing regions where the depths increase discontinuously. The depths of the recesses 46c, 45c in the region of the annular part W41 are deeper than the depths of the recesses 43c, 42c which are located in a region in the annular inner part W42 and the annular outer part W43 and are close to the annular part W41. In the region of the annular part 41, it is difficult, in terms of angle, for light to be emitted at a total reflection angle, and therefore, the deeper recesses are provided than those which are located in the region in the annular inner part W42 and annular outer part W43 and are close to the annular part W41, making it possible to emit the light more easily. Such a distribution allows light to be emitted uniformly from its entirety.

Furthermore, in order to allow the recesses 43c, 42c, 46c, 45c to have the same depth, after modifying the vertical axis of FIG. 5B from depth of recesses to density of recesses, the density of recesses (number of recesses per unit area) shown, for example, in modified FIG. 5B can be used. As shown in modified FIG. 5B, the density of recesses is high in the region of the annular part 41, and once decreases where the annular inner part 42 (or the annular outer part 43) is reached, and thereafter the density of recesses increases as they get closer to the center (or end) of the light guide plate 40. Particularly in the region of the annular part W41, it is difficult, in terms of angle, for light to be emitted at a total reflection angle, and therefore, the density of recesses is increased to allow more light to be emitted. Such a distribution allows light to be emitted uniformly from its entirety.

Note that this also applies to the case where projections are provided on each of the back side surfaces of the light guide plate 40 as a light scattering treatment, instead of the recesses provided thereon as described above. Further, a change in each of the depth of the recesses and the density of the recesses leads to a change in an area occupation ratio.

As described above, an area occupation ratio of the recesses 45c, 42c in the first light scattering region 45b of the annular part 41 and the back side surface 42b (third light scattering region) of the annular inner part 42 has a tendency to increase from the first light scattering region 45b of the annular part 41 toward the back side surface 42b of the annular inner part 42. However, as shown in modified FIG. 5B, in the increase in the area occupation ratio of the recesses 45c, 42c from the first light scattering region 45b of the annular part 41 toward the back side surface 42b of the annular inner part 42, there is a discontinuity between the first light scattering region 45b of the annular part 41 and the back side surface 42b of the annular inner part 42.

On the other hand, as shown in FIG. 3, the annular outer part 43 has an outer peripheral surface 43d which has been subjected to a process such that, when light emitted from the outer peripheral surface 43d and reflected by an end surface 17 of the housing 10 enters the light guide plate 40 again, the outer peripheral surface 43d diffuses the light. The light propagating in the annular outer part 43 and reaching the outer peripheral surface 43d is reflected by the end surface 17 of the housing 10, and enters the light guide plate 40 again from the outer peripheral surface 43d, and thus goes toward the annular part 41 as return light.

Note that the light scattering treatment (recesses) applied to the annular inner part 42 and the annular outer part 43 is not limited to that described above, and is arbitrary. For example, instead of the recesses, projections can be provided as the light scattering treatment, or both of the recesses and the projections can be provided. Further, the light scattering treatment can be applied to the front side surfaces 42a, 43a instead of the back side surfaces 42b, 43b, or can be applied to both of the back side surfaces 42b, 43b and the front side surfaces 42a, 43a. However, in a preferred mode, light is emitted uniformly from the front side surface 42a of the annular inner part 42 and the front side surface 43a of the annular outer part 43 in their entirety.

Figure 7A:
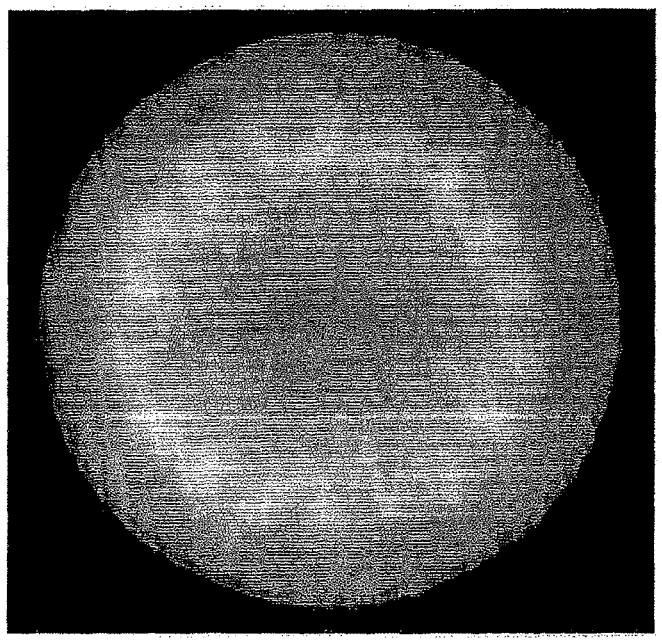
FIG. 7A is a photograph of a conventional illumination device, taken with the light on, to explain luminance unevenness generated in the illumination device.
Figure 7B:
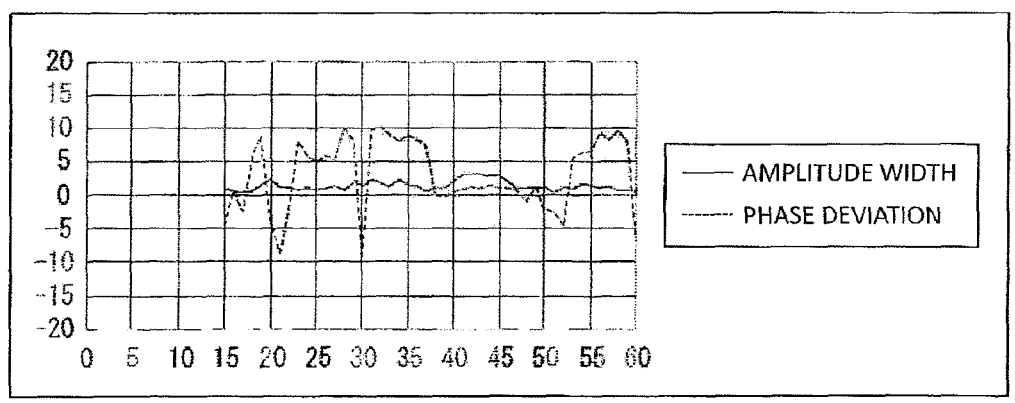
FIG. 7B is a graph of analysis results based on the photograph of FIG. 7A.
Figure 8:
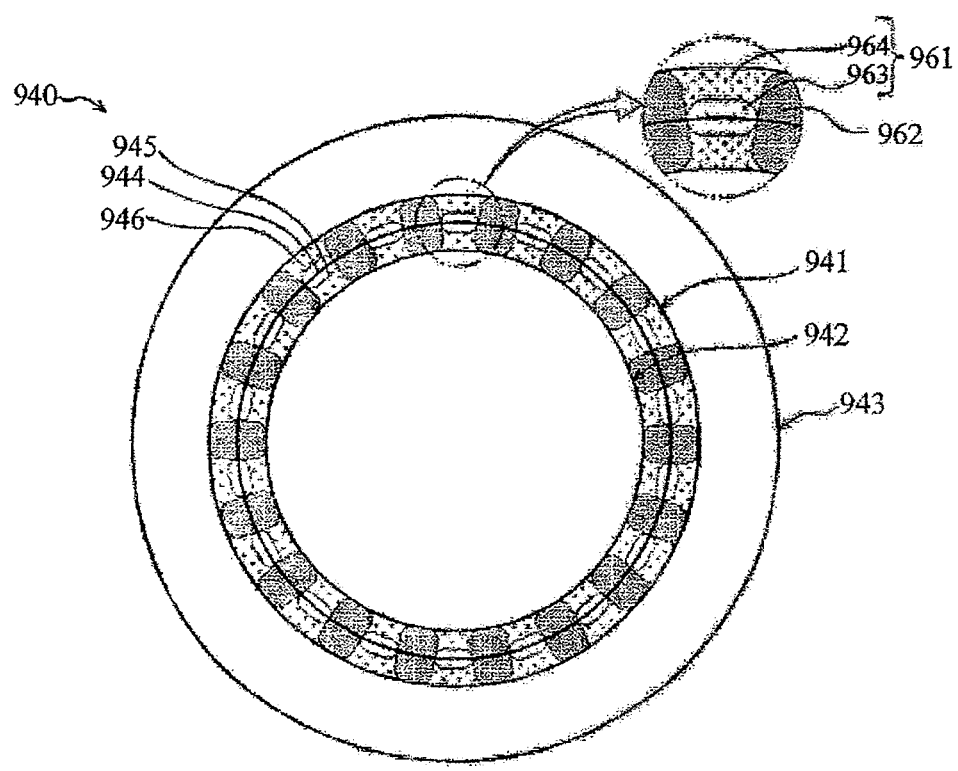
FIG. 8 is a schematic view for explaining luminance unevenness generated in the conventional illumination device.

FIG. 7A is a photograph of a conventional illumination device, taken with the light on, to explain the luminance unevenness generated in the illumination device. FIG. 7B is a graph of analysis results based on the photograph of FIG. 7A, where the vertical axis represents amplitude width of waveform of radial luminance and phase (deviation) of maximum amplitude, which are obtained by Fourier-transforming the radial luminance of an upper surface of the cover (by calculating amplitude spectrum and phase spectrum), while the horizontal axis represents radius from the center of the upper surface of the cover. The light emitting elements are arranged on a radius of 44 mm and a phase position of 0 degree, while a phase of 10 degrees corresponds to a middle position between the respective light emitting elements. However, since FIG. 7B is analysis results of the radial luminance of the upper surface of the cover, the phase at the radial position of 44 mm is slightly deviated from 0 degree. FIG. 8 schematically shows the luminance unevenness shown in FIG. 7A. Note that FIG. 7A shows the luminance unevenness through the diffusion cover, while FIG. 8 shows the luminance unevenness on the front side surface of the light guide plate.

Figure 19:
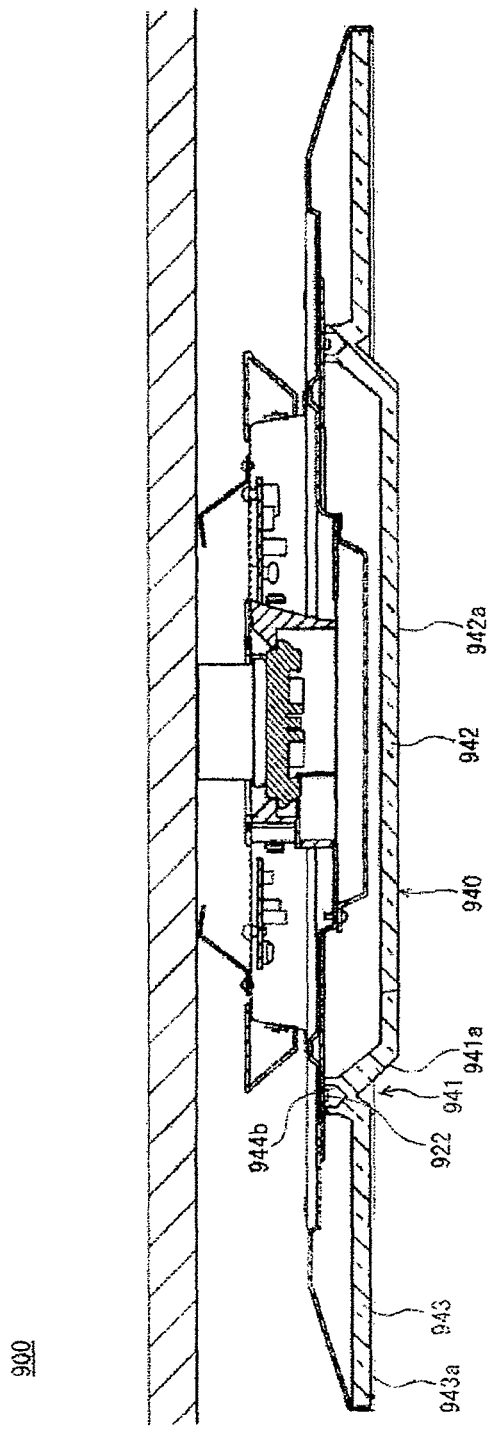
FIG. 19 is a cross-sectional view of a conventional direct type illumination device.

In the conventional direct type illumination device (refer to FIG. 19), the luminance unevenness such as shown, for example, in FIG. 7A is generated. In FIG. 7B, the amplitude width of the luminance distribution becomes large at a radial position of 40-45 mm, and the phase near such a position is approximately 0 degree. This indicates that the luminance unevenness is generated in a circumferential direction (direction along the circumference) near where the light emitting elements 922 (refer to FIG. 19) are present, indicating that the regions above the light emitting elements 922 are bright, while the regions between them are dark. As shown in FIG. 8, regions 962 where the light emitting elements 922 (refer to FIG. 19) are not present are shadow regions as compared with regions 961 where the light emitting elements 922 are present, which is one of the causes of the luminance unevenness.

Further, although in the annular part 941 light is emitted from an element array-facing part 944 facing the light emitting elements, almost no light is emitted from other regions than the element array facing part 944, thus causing, for example, shadow regions as shown in FIG. 7A. In addition, the luminance of the shadow regions decreases as they get farther from the element array-facing part. More specifically, as shown in FIG. 8, the luminance of regions 963 which are close to the light emitting elements 922 is high, while the luminance of regions 962, 964 which are far from the light emitting elements 922 is low, and this difference in luminance is one of the causes of the luminance unevenness. In the present embodiment, a light scattering treatment is applied to the back side surfaces of the annular part 41 to reduce such luminance unevenness.

Figure 9A:
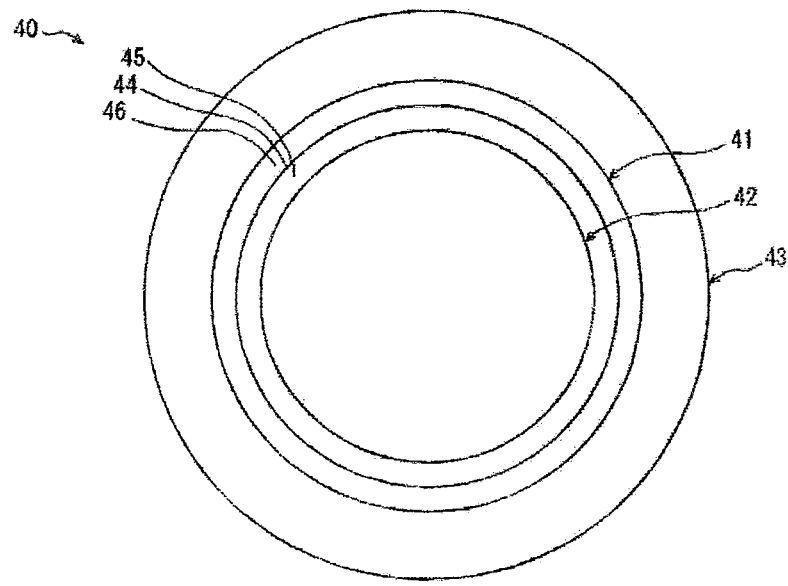
FIG. 9A is a schematic view for explaining luminance unevenness reduction effect by a reflecting member of the illumination device according to the first embodiment, and is a view of the light guide plate as seen from the front side.
Figure 9B:
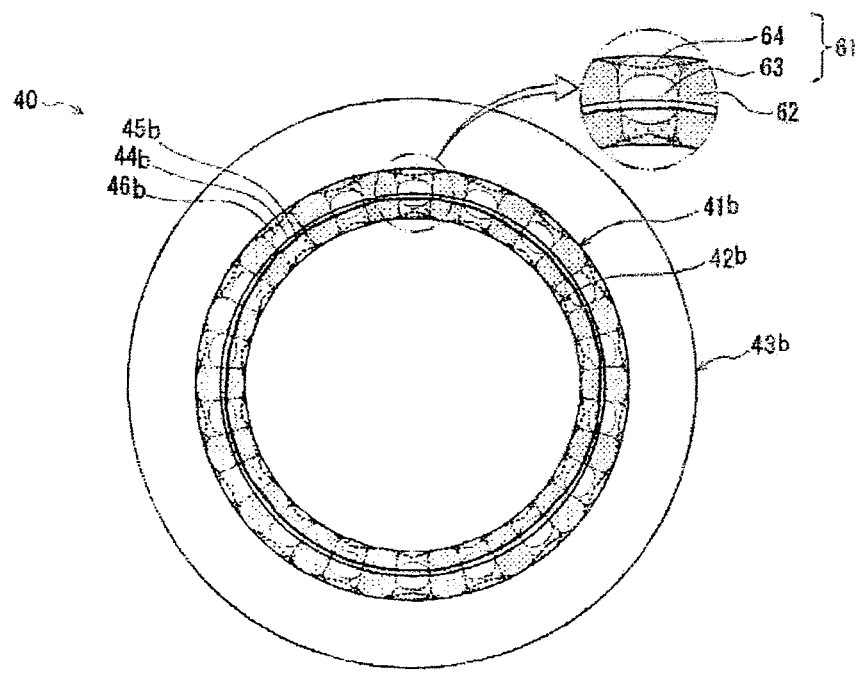
FIG. 9B is a schematic view for explaining the luminance unevenness reduction effect by the reflecting member of the illumination device according to the first embodiment, and is a view of the light guide plate as seen from the back side.

FIG. 9A and FIG. 9B are schematic views for explaining the luminance unevenness reduction effect by the light guide plate 40, in which FIG. 9A is a view of the light guide plate 40 as seen from the front side, and FIG. 9B is a view of the light guide plate 40 as seen from the back side.

Figure 10:
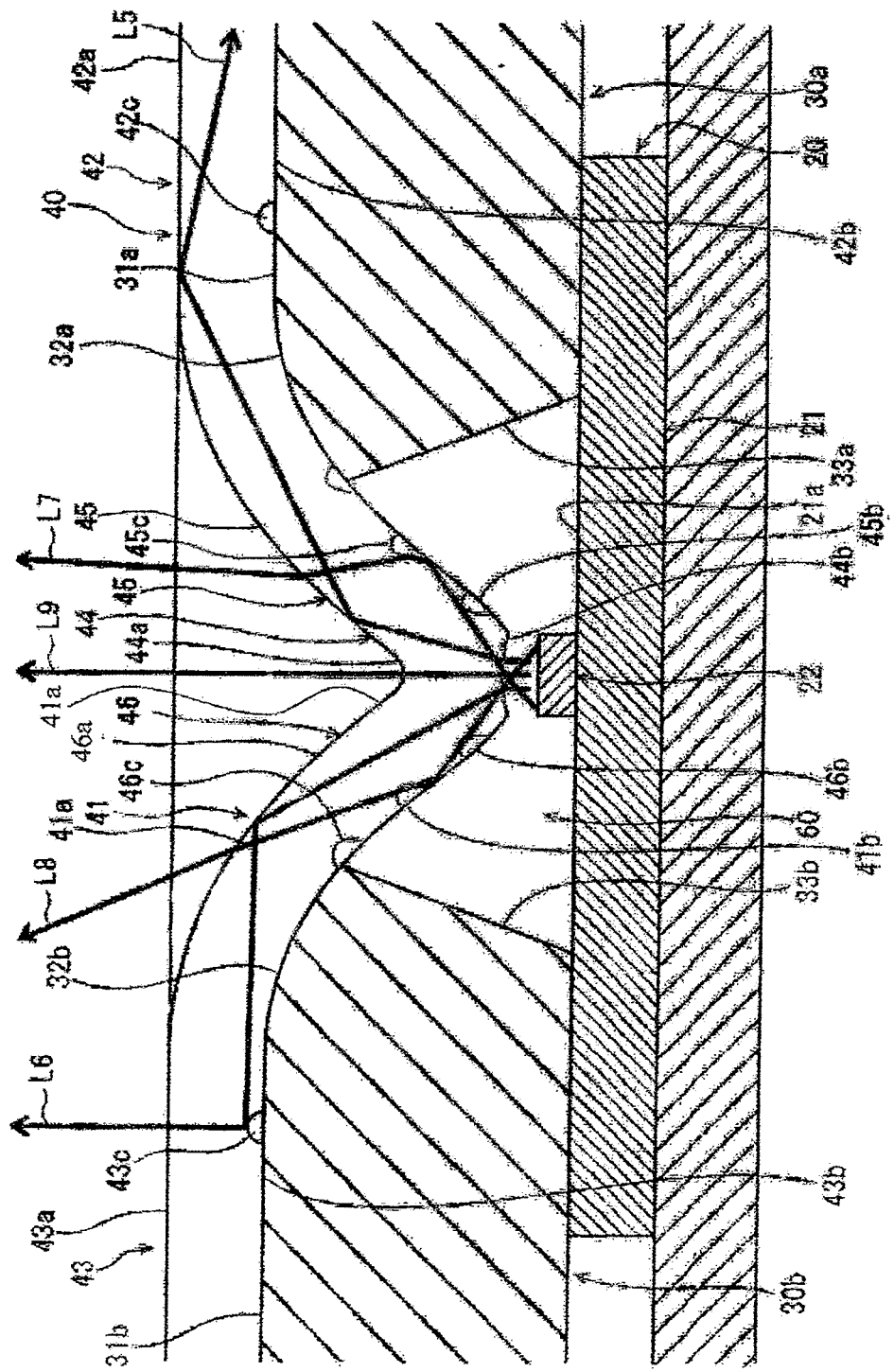
FIG. 10 is a schematic view for explaining a path of light entering the light guide plate directly from a light emitting element of the illumination device.

FIG. 10 is a schematic view for explaining a path of light entering the light guide plate 40 directly from the light emitting element 22. As shown by L5 in FIG. 10, light entering the light guide plate 40 from the back side surface 44b of the element array-facing part 44 is reflected, for example, by the front side surface 41a of the annular part 41 and guided into the annular inner part 42, and propagates in the annular inner part 42 while being reflected repeatedly between the front side surface 42a and the back side surface 42b of the annular inner part 42. Otherwise, as shown by L6, it is reflected by the front side surface 41a of the annular part 41 and guided into the annular outer part 43, and propagates in the annular outer part 43 while being reflected repeatedly between the front side surface 43a and the back side surface 43b of the annular outer part 43.

The lights L5 and L6 ultimately enter the recesses 42c, 43c to become scattered lights, and are emitted from the front side surface 42a, 43, such as the light L6 which is emitted from the front side surface 43a. Note that also the light L5 ultimately enters the recesses 42c, while propagating in the annular inner part 42, and becomes scattered light, and is then emitted from the front side surface 42a.

Thus, the front side surface 41a of the annular part 41 is basically a reflecting surface to reflect light entering the annular part 41 and guide it to the annular inner part 42 or the annular outer part 43. Thus, it is difficult for the light to be emitted from the annular part 41, making it easy to cause shadow regions in the annular part 41. However, in the present embodiment, the recesses 45c, 46c are provided in the surface 41b facing the front side surface 41a of the annular part 41, so that as shown by L7 and L8, the lights enter the element array-facing part 44 of the light guide plate 40 diagonally, and are scattered by the recesses 45c, 46c to be also emitted from the front side surface 41a of the annular part 41. Thus, it is difficult for shadow regions to be generated in the annular part 41.

In addition, the degree of ease in the emission is not the same in the entire region of the front side surface 41a of the annular part 41. More specifically, the emission is relatively easier from regions 62 and 64 (FIG. 9B) which are farther from the light emitting elements 22, while the emission is relatively more difficult from regions 63 which are closer to the light emitting elements 22 than the regions 62 and 64. This is because the number of provided recesses 45c, 46c per unit area varies depending on location.

Note that, as described above, there is the bent portion having a round shape in the front side surface 44a of the element array-facing part 44, while as shown by L9 the bent portion allows the light to pass through, and to be emitted to the outside as it is. If the amount of light emitted from the surface 44a is large, there is likelihood that the portion is too bright and too noticeable.

Thus, preferably, the bent portion has a radius equal to or less than 0.05 mm, and more preferably equal to or less than 0.02 mm. If the radius exceeds 0.05 mm, the luminance of the surface of the cover due to the light emitted from the round portion becomes equal to or higher than 1.5 times the luminance of the surface of the cover due to the light emitted from the recesses 45c, 46c, causing bright regions to be too noticeable. If the radius is equal to or less than 0.02 mm, the luminance of the surface of the cover due to the light emitted from the round portion becomes homogeneous, whereby brighter regions than the other regions in the surface of the cover are substantially absent.

Figure 11:
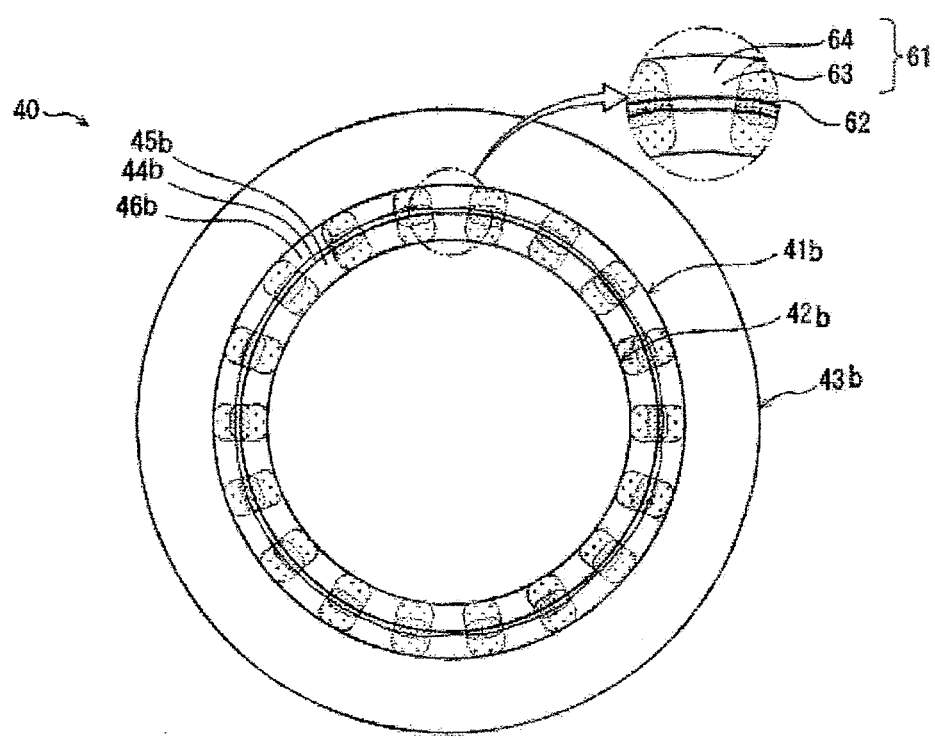
FIG. 11 is a schematic view for explaining the luminance unevenness reduction effect by the light guide plate of the illumination device.

FIG. 11 is a schematic view for explaining the luminance unevenness reduction effect by the light guide plate 40, and expresses the luminance without taking into account the luminance unevenness reduction effect by the reflecting member 30 (refer to FIG. 3, FIG. 4 and FIG. 10). As shown in FIG. 11, in the present embodiment, the light scattering treatment is applied to (the recesses 45c, 46c (FIG. 10) are provided on) the back side surface 41b of the annular part 41, so that light is also emitted from the annular part 41. Thus, the luminance in the annular part 41 is relatively higher than the conventional light device, thereby reducing the luminance unevenness.

In addition, a denser light scattering treatment is applied to the back side surface of the regions 62 and 64, which are farther from the element array-facing part 44 of the annular part 41, than to the back side surface of the regions 63 which are closer to the element array-facing part 44 of the annular part 41. Thus, light is more easily emitted from the regions 62 and 64, which are farther from the element array-facing part 44 of the annular part 41, than from the regions 63 which are closer to the element array-facing part 44, thereby reducing the difference in luminance between the regions 63 closer to and the regions 62 and 64 farther from the light emitting elements 22, resulting in a reduction of the luminance unevenness.

(Luminance Unevenness Reduction Effect)

Figure 12A:
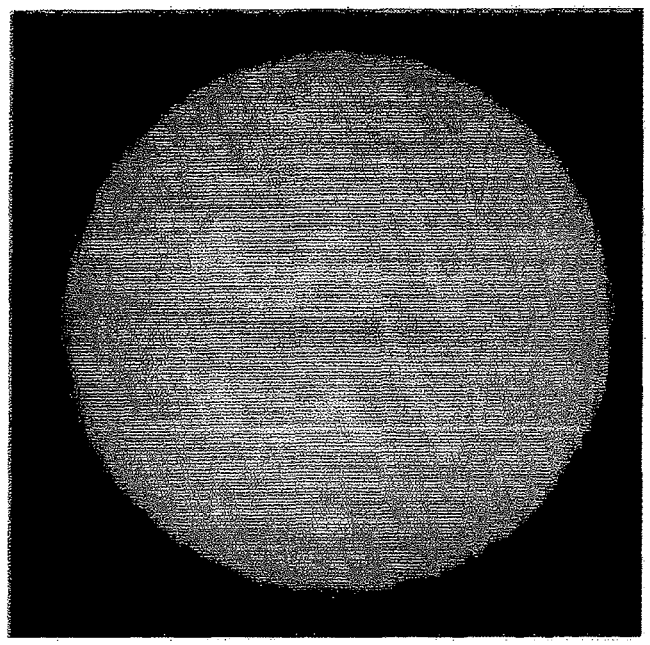
FIG. 12A is a photograph of the illumination device, taken with the light on, to explain the luminance unevenness reduction effect by a combination of the light guide plate and a reflecting member of the illumination device.
Figure 12B:
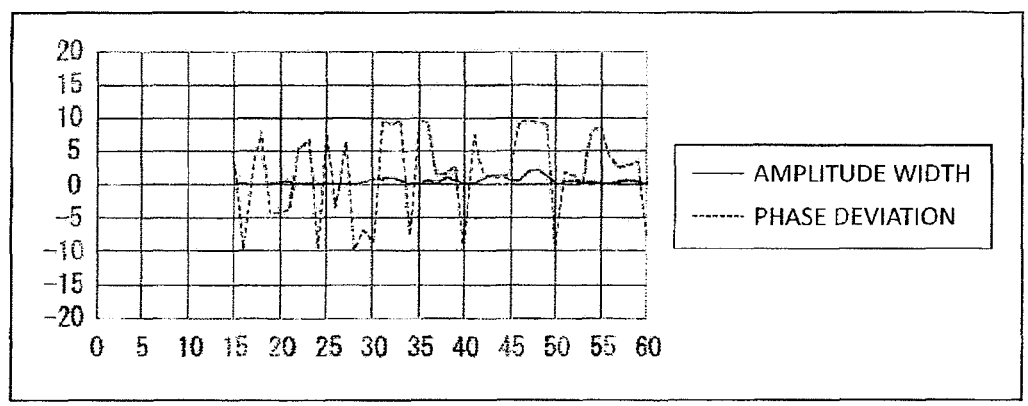
FIG. 12B is a graph of analysis results based on the photograph of FIG. 12A.

FIG. 12A is a photograph of the illumination device 1, taken with the light on, to explain the luminance unevenness reduction effect by a combination of the scattering treatment to the back side of the annular part of the light guide plate and the shape of the reflecting member of the illumination device. FIG. 12B is a graph of analysis results based on the photograph of FIG. 12A, where the vertical axis represents amplitude width of waveform of radial luminance and phase (deviation) of maximum amplitude, which are obtained by Fourier-transforming the radial luminance of an upper surface of the cover (by calculating amplitude spectrum and phase spectrum), while the horizontal axis represents radius from the center of the upper surface of the cover. The light emitting elements 22 are arranged on a radius of 44 mm and a phase position of 0 degree, while a phase of 10 degrees corresponds to a middle position between the respective light emitting elements 22. However, since FIG. 12B is analysis results of the radial luminance of the upper surface of the cover, the phase at the radial position of 44 mm is slightly deviated from 0 degree.

Figure 13:
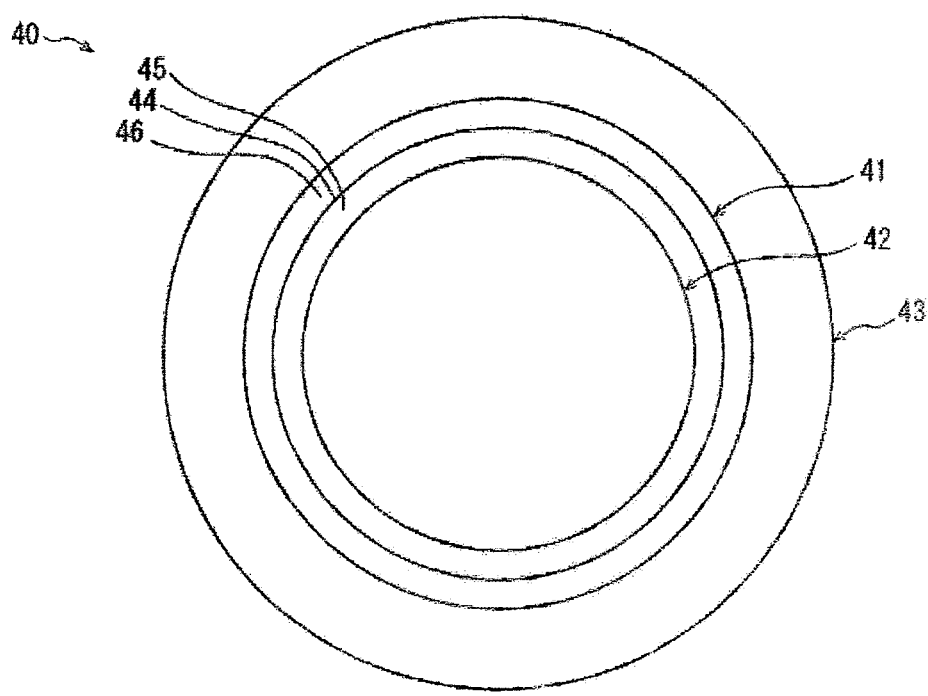
FIG. 13 is a schematic view for explaining the luminance unevenness reduction effect by a combination of the light guide plate and the reflecting member of the illumination device.

FIG. 13 schematically shows the luminance distribution of the light guide plate 40 without the diffusion cover 50 (refer to FIG. 3). On the other hand, FIG. 12A shows the luminance unevenness through the diffusion cover 50. Due to the diffusion cover 50, completely no luminance unevenness is observed.

In FIG. 12B, the amplitude width of the luminance distribution at a radial position of 40-45 mm is significantly reduced as compared with FIG. 7B.

The light device 1 according to the present embodiment uses a combination of the reflecting member 30 and the light guide plate 40, so that it has both the luminance unevenness reduction effect by the reflecting member 30 and the luminance unevenness reduction effect by the light guide plate 40. Thus, the illumination device 1 with almost no luminance unevenness as shown in FIG. 12A, FIG. 12B and FIG. 13 is obtained.

Note that it is sufficient that the illumination device 1 according to the present invention has a structure for the light guide plate 40 so as to obtain the luminance unevenness reduction effect at least by the light guide plate 40, and the structure for the reflecting member 30 is arbitrary. Thus, it is possible to use a conventional structure for the reflecting member 30.

As described above, in the present embodiment, the light scattering treatment applied to the first light scattering region 45b is to provide recesses and/or projections in the reflecting surface of the first reflecting part 45 (inner reflecting part), while the light scattering treatment applied to the second light scattering region 46b is to provide recesses and/or projections in the reflecting surface of the second reflecting part 46 (outer reflecting part). The number of recesses and/or projections in the first light scattering region 45b (on its reflecting surface) per unit area, and the number of recesses and/or projections in the second light scattering region 46b (on its reflecting surface) per unit area increase as they get farther from the light emitting elements 22. Further, the area occupation ratio of the recesses and/or projections in the first light scattering region 45b (on its reflecting surface), and the area occupation ratio of the recesses and/or projections in the second light scattering region 46b (on its reflecting surface) increase as they get farther from the light emitting elements 22.

<Second Embodiment>

Figure 14:
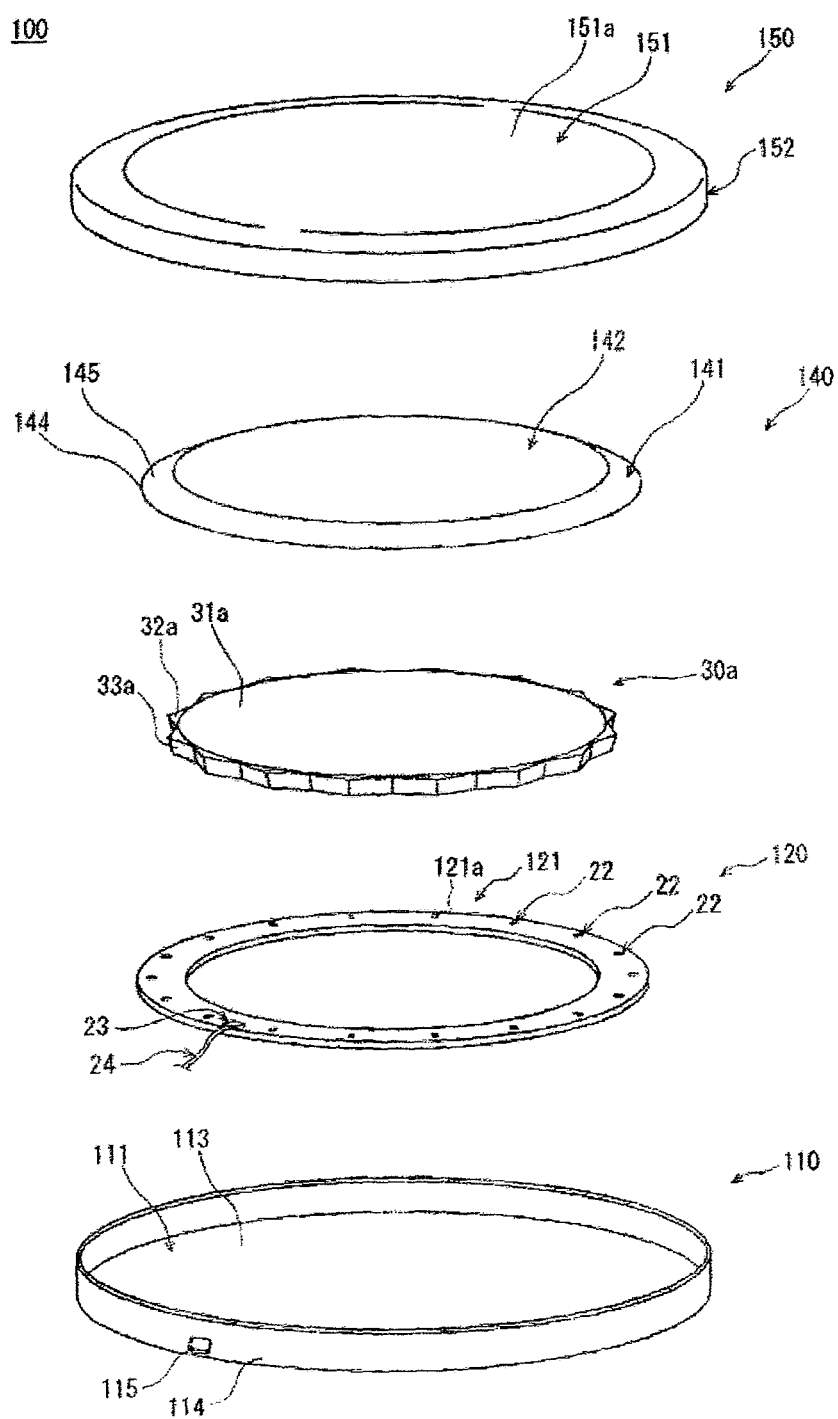
FIG. 14 is an exploded perspective view of an illumination device according to a second embodiment of the present invention.
Figure 15:
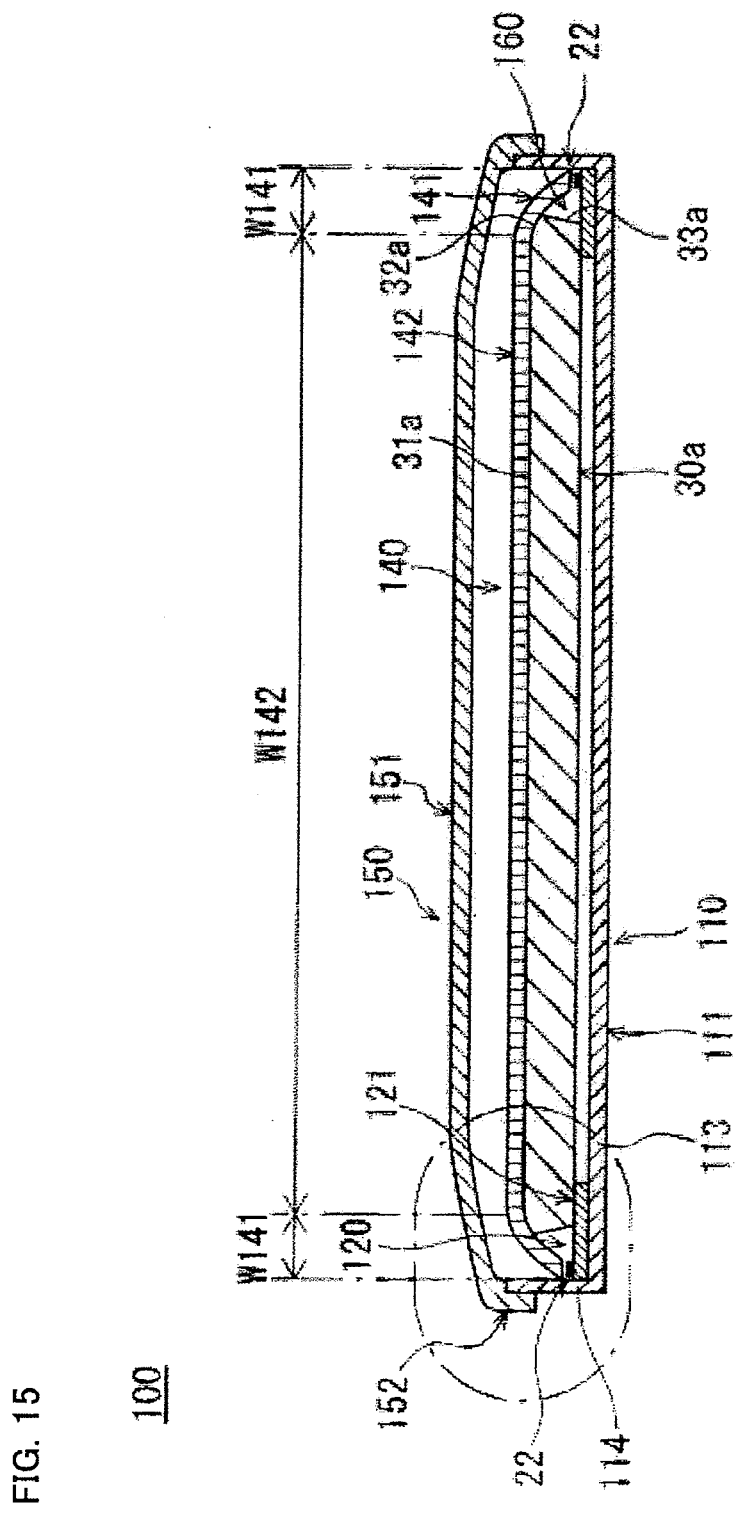
FIG. 15 is a cross-sectional view showing the illumination device.
Figure 16:
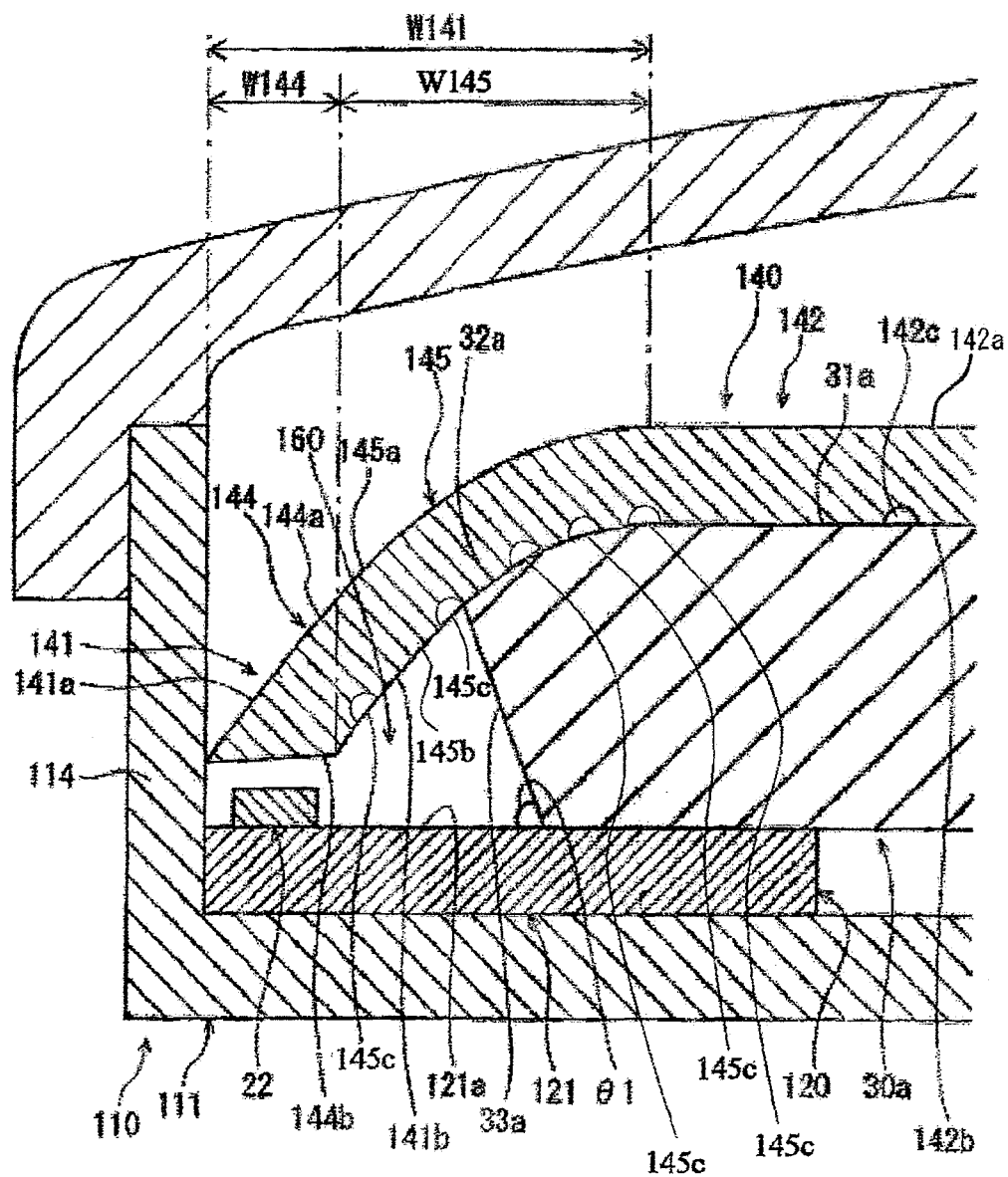
FIG. 16 is an enlarged cross-sectional view of a portion surrounded by a one-dot chain line shown in FIG. 15.

FIG. 14 is an exploded perspective view of an illumination device according to a second embodiment. FIG. 15 is a cross-sectional view showing the illumination device according to the second embodiment. FIG. 16 is an enlarged cross-sectional view of a portion surrounded by a one-dot chain line shown in FIG. 15.

The illumination device 100 according to the second embodiment is much different from the illumination device 1 according to the first embodiment in that a reflecting member 30 comprises only an inner reflecting member 30a, and that a light guide plate 140 does not comprise an annular outer part. Since it has many similarities to the illumination device 1 according to the first embodiment, only the differences between the two will be described, and the same reference numerals are used for the common structure, and a description thereof is omitted.

As shown in FIG. 14 to FIG. 16, the illumination device 100 comprises, for example, a housing 110, a light emitting module 120, an inner reflecting member 30a, a light guide plate 140, a diffusion cover 150 and so on.

(Diffusion Cover 150)

As shown in FIG. 14, the diffusion cover 150 comprises a main body part 151 of a dome shape to cover the light guide plate 140 and a side wall part 152 extending from a peripheral portion of the main body part 151 toward its back side, while the side wall part 152 is fixed to a side wall part 114 of a main body part 111 of the housing 110. The main body part 151 has a light scattering treatment applied thereto, so that the light emitted from the light guide plate 140 becomes scattered light when it passes through the main body part 151.

(Light Guide Plate 140)

As shown in FIG. 14, the light guide plate 140 has a circulate plate shape, and comprises an annular part 141 formed in an annular shape along an element array of light emitting elements 22, and an annular inner part 142 of a circular plate shape with its periphery surrounded by the annular part 141. The annular part 141 and the annular inner part 142 are integrally molded.

The annular part 141 comprises an element array-facing part 144 and a light reflecting part 145. The element array-facing part 144 is an annular part facing the element array of the multiple light emitting elements 22. The light reflecting part 145 is located on the annular inside of the element array-facing part 144, and has an annular shape along the element array-facing part 144.

In FIG. 15, the region indicated by the symbol W141 is the annular part 141, and the region indicated by the symbol W142 is the annular inner part 142. In FIG. 16, the region indicated by the symbol W144 is the element array-facing part 144, and the region indicated by the symbol W145 is the light reflecting part 145.

Note that the shape of the light guide plate according to the present embodiment is not limited to the circular plate shape, and is arbitrary. For example, it can be a polygonal plate shape such as quadrangular plate shape, hexagonal plate shape, octagonal plate shape or the like. Further, the shape of each of the annular part, the annular inner part, the annular outer part, the element array-facing part, the first light scattering region and the second light scattering region is arbitrary corresponding to the shape of the light guide plate. Further, the arrangement of the light emitting elements and the shape of the substrate are also arbitrary corresponding to the shape of the light guide plate.

The annular part 141 has a front side surface 141a which is a reflecting surface for reflecting the light of the light emitting elements 22, which enters the annular part 141 from the back side, toward the annular inner part 142. In a longitudinal cross-section of the light guide plate 140, the shape of the front side surface 141a of the annular part 141 is a substantially arc shape protruding toward the front side.

The annular part 141 has a back side surface 141b having a light scattering treatment applied thereto. More specifically, recesses 145c are provided, as a light scattering treatment, in the first light scattering region 145b which forms the back side surface of a first reflecting part. Due to the application of the light scattering treatment, the light entering the back side surface 141b from the inside of the annular part 141 is not totally reflected, and a part of it is scattered by the recesses 145c and emitted to the outside of the light guide plate 140. The recesses 145c each have a substantially hemispherical shape, and all have the same size.

Different modes of light scattering treatment are applied to the first light scattering region 145 depending on location. More specifically, the number of recesses 145c per unit area in the reflecting surface of the first light scattering region 145b is larger on the back side of parts 62 and 64 which are farther from the light emitting elements 22 than on the back side of parts 63 (refer to FIG. 9B) which are closer thereto. Thus, light is more easily emitted from the regions 62 and 64 (refer to FIG. 9B), which are farther from the light emitting elements 22, than from the regions 63 which are closer to the light emitting elements 22.

A part of the back side surface 141b of the annular part 141 is an incident surface to allow the light of the light emitting elements 22 to enter. A back side surface 144b of the element array-facing part 144 corresponds to the incident surface. The back side surface 144b of the element array-facing part 144 has an annular shape facing the element array of the multiple light emitting elements 22. Further, the entire back side surface 141b of the annular part 141 also serves as an incident surface to allow the light reflected by an element mounting surface 121a of a substrate 121 in an element housing groove 160 to enter.

The structure of the annular inner part 142 is substantially the same as the annular inner part 42 according to the first embodiment. Further, the components shown in FIG. 16 with reference numerals 142a, 144a, 145a correspond to the front side surface 42a of the annular inner part 42, the front side surface 44a of the element array-facing part 44, and the front side surface 45a of the first reflecting part 45 in the first embodiment, respectively.

In the second embodiment, similarly as in the first embodiment, recesses 142c are provided in a back side surface 142b (third light scattering region) of the annular inner part 142 as a light scattering treatment. Distributions (densities) and shapes of the recesses 145c, 142c are similar to the recesses 45c, 42c of the first embodiment.

(Reflecting Member 30a)

As shown in FIG. 14, the reflecting member comprises only the inner reflecting member 30a of the first embodiment, and is disposed close to the light guide plate 140 on the back side of the light guide plate 140 as shown in FIG. 15, and more specifically disposed on the back side of the annular inner part 142 of the light guide plate 140 so as to avoid the light emitting elements 22 (so as not to overlap the light emitting elements 22).

As shown in FIG. 16, the inner reflecting member 30a has a first light reflecting surface 31a which faces the back side surface 142b of the annular inner part 142 of the light guide plate 140 so as to serve to reflect light leaking from the annular inner part 142 to the back side and return it to the annular inner part 142. The inner reflecting member 30a has a second light reflecting surface 32a which faces a part of the back side surface (corresponding to the first light scattering region 145b) of the light reflecting part 145 of the annular part 141 of the light guide plate 140 so as to serve to reflect light leaking from the light reflecting part 145 to the back side and return it to the light reflecting part 145. The first light reflecting surface 31a is in surface contact with the back side surface 142b of the annular inner part 142, while the second light reflecting surface 32a is in surface contact with the first light scattering region 145b.

The inner reflecting member 30a and the housing 110 are arranged on the back side of the light guide plate 140 such that an outer peripheral surface 33a of the inner reflecting member 30a and a part of the side wall part 114 of the main body part 111 of the housing 110 face each other with a space therebetween. Thus, the inner reflecting member 30a and the housing 110 define the element housing groove 160 of an annular shape for housing the light emitting elements 22. The element housing groove 160 is a region on the back side of the annular part 141 of the light guide plate 140 where the inner reflecting member 30a is not present.

The element housing groove 160 has an inner peripheral surface which comprises the outer peripheral surface 33a of the inner reflecting member 30a, and the element housing groove 160 has an outer peripheral surface which comprises the inner peripheral surface of the side wall part 114 of the housing 110, while the element housing groove 160 has a bottom surface which comprises the element mounting surface 121a of the substrate 121. Further, the outer peripheral surface 33a of the inner reflecting member 30a and the element mounting surface 121a of the substrate 121 form an angle θ1 therebetween which is an acute angle. Further, the element housing groove 160 has a groove width gradually increasing from the front side to the back side. Note that the inner peripheral surface of the side wall part 114 of the housing 110 is a reflecting surface.
(Light Emitting Module 120)

As shown in FIG. 14, the light emitting module 120 comprises the substrate 121 of an annular plate shape and the multiple light emitting elements 22 mounted on the element mounting surface 121a of the substrate 121 as one major surface thereof, and is arranged on the back side of the light guide plate 140. The respective light emitting elements 22 are annularly arranged on the element mounting surface 121a of the substrate 121 with their respective main emission directions directed to the light guide plate 140. The substrate 121 is substantially the same as the substrate 21 according to the first embodiment, except for being smaller in outer diameter as compared therewith. Each light emitting element 22 is electrically connected to a power supply wire 23 through a wiring pattern (not shown) formed on the substrate 121 and a connector 24. The element mounting surface 121a of the substrate 121 serves as a reflecting surface to efficiently reflect light toward the light guide plate 140.
(Housing 110)

As shown in FIG. 14, the housing 110 has, for example, a dish shape made by aluminum die casting, and comprises the main body part 111 of a cylindrical shape with a bottom, in which the main body part 111 comprises a bottom plate part 113 of a circular plate shape, and a cylindrical side wall part 114 extending from an outer periphery of the bottom plate part 113. As shown in FIG. 16, the light emitting module 120, the inner reflecting member 30a and the light guide plate 140 are housed inside the main body part 111. Referring back to FIG. 14, the side wall part 114 of the main body part 111 has a through-hole 115 formed therein to allow the power supply wire 23 to pass through.
(Luminance Unevenness Reduction Effect)

In the present embodiment, similarly as in the first embodiment, the light scattering treatment is applied to the back side surface 141b of the annular part 141, so that the luminance in the annular part 141 is relatively higher than the conventional light device, thereby reducing the luminance unevenness. Further, light is more easily emitted from the regions 62 and 64, which are farther from the light emitting elements 22, than from the regions 63 (refer to FIG. 9B) which are close thereto, thereby eliminating the difference in luminance between the regions 63 closer to and the regions 62 and 64 (refer to FIG. 9B) farther from the light emitting elements 22, resulting in a reduction of the luminance unevenness.

The light device 100 according to the present embodiment uses a combination of the inner reflecting member 30a and the light guide plate 140, so that it has both the luminance unevenness reduction effect by the reflecting member and the luminance unevenness reduction effect by the light guide plate. Note that it is sufficient that the illumination device according to the present invention has a structure for the light guide plate so as to obtain the luminance unevenness reduction effect at least by the light guide plate, and the structure for the reflecting member is arbitrary. Thus, it is possible to use a conventional structure for the reflecting member.
<Modified Example>

Figure 17:
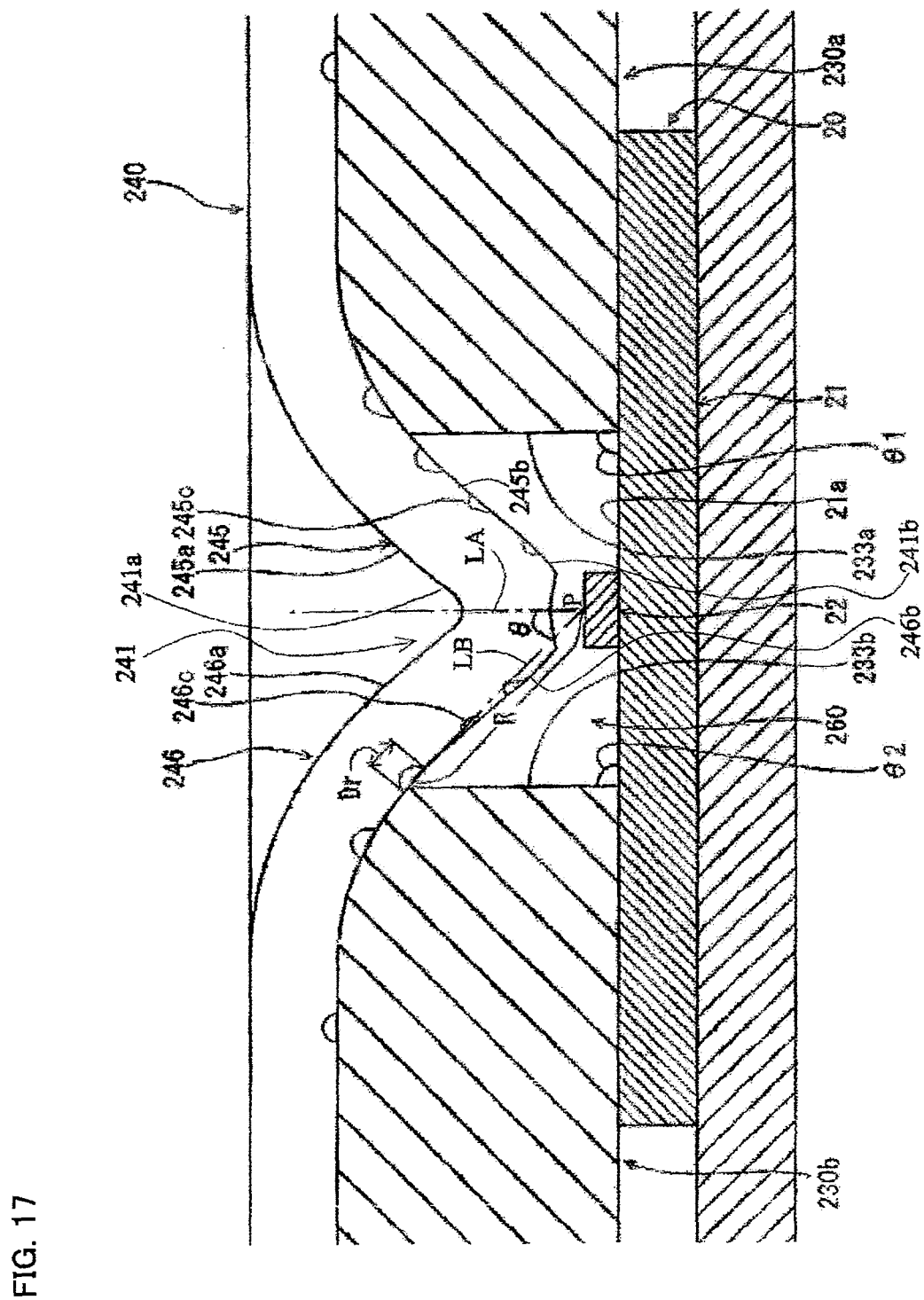
FIG. 17 is a cross-sectional view for explaining a light guide plate and a reflecting member according to a modified example of the present invention.
Figure 18:
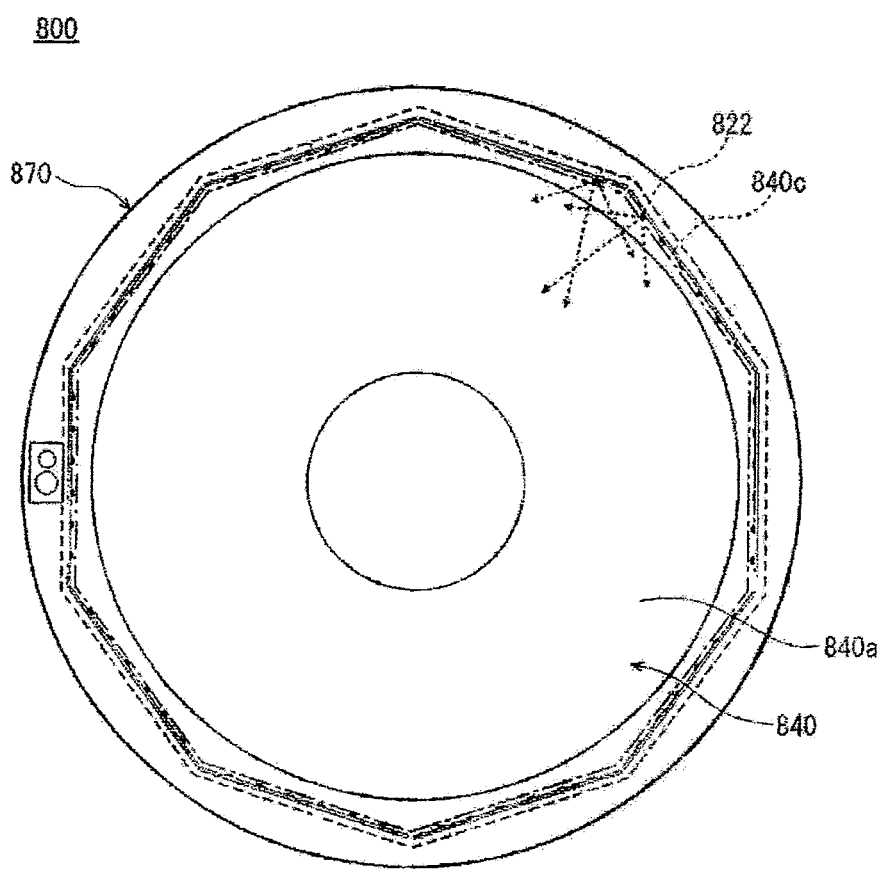
FIG. 18 is a plan view of a conventional edge light type illumination device.

Hereinafter, a modified example of an illumination device according to the present invention will be described. FIG. 17 is a cross-sectional view for explaining a light guide plate and a reflecting member according to the modified example.
(Reflecting Member)

In the first embodiment, the angle θ1 between the element mounting surface 21a of the substrate 21 and the outer peripheral surface 33a of the inner reflecting member 30a is an acute angle. However, as shown in FIG. 17, the angle θ1 between the element mounting surface 21a of the substrate 21 and an outer peripheral surface 233a of an inner reflecting member 230a can be a right angle or an obtuse angle. Further, in the first embodiment, the angle θ2 between the element mounting surface 21a of the substrate 21 and the inner peripheral surface 33b of the outer reflecting member 30b is an acute angle. However, as shown in FIG. 17, the angle θ2 between the element mounting surface 21a of the substrate 21 and an inner peripheral surface 233b of an outer reflecting member 230b can be a right angle or an obtuse angle.
(Light Guide Plate)

Further, as to the light guide plate according to the present invention, the light scattering treatment applied to the annular part 41 is not limited to the light scattering treatment in the first embodiment, and is arbitrary. For example, instead of the recesses, projections can be provided as the light scattering treatment, or both of the recesses and the projections can be provided.

Further, although in the light guide plate 40 according to the first embodiment the mode of light scattering treatment is changed by changing the number of recesses 45c, 46c per unit area provided in the back side surface 41b of the annular part 41, the mode of light scattering treatment can be changed in another way.

For example, in the light guide plate 240 shown in FIG. 17, a different mode of light scattering treatment is achieved by using the same number of recesses 245c, 246c per unit area in a back side surface 241b of an annular part 241, but by changing their size. In other words, the area occupation ratio of the recesses 245c, 246c is changed to change the area of a region serving as a light scattering surface in the back side surface 241b of the annular part 241, so as to achieve a different mode of light scattering treatment.

More specifically, the number of recesses 245c per unit area provided in the first light scattering region 245b is the same over the entire region. However, the area of each recess 245c decreases as it gets closer to the light emitting elements 22.

Similarly, the number of recesses 246c per unit area provided in the second light scattering region 246b is the same over the entire region. However, the area of each recess 246c decreases as it gets closer to the light emitting elements 22, and as a deviation angle of the recess relative to an optical axis of the light emitting element decreases. In other words, the area occupation ratio of the recesses 246c in the reflecting surface of the second light scattering region 246b increases as the deviation angles of the recesses 246c relative to optical axes LA of the light emitting elements 22 increase. Referring to FIG. 17, assuming that P is an intersection point between an optical axis LA of a light emitting element 22 and a surface of the light emitting element 22, the deviation angle of a recess relative to the optical axis of the light emitting element is an angle θ between the optical axis LA of the light emitting element 22 and a line LB connecting the point P and a position of each recess 246c in the reflecting surface of the second light scattering region 246b. As its deviation angle 8 relative to the optical axis of the light emitting element 22 increases, and as the position of each recess 246c gets farther from the light emitting element 22, an emission intensity of light from the light emitting element 22 decreases. By adjusting the area occupation ratio of the recesses 246c according to this relationship, it becomes possible to make uniform the amount of emission from the light guide plate 240 over the entire front side surface of the light guide plate 240.

Like the area occupation ratio of the recesses 246c in the reflecting surface of the second light scattering region 246b, the area occupation ratio of the recesses 245c in the reflecting surface of the first light scattering region 245b also increases as the deviation angles of the recesses 245c relative to the optical axes LA of the light emitting elements 22 increase. It is considered that the size of each of the recesses 245c, 246c is changed based on the following equation 1:

$$Dr = k1 \times R^n / \cos(m \times \theta) + k2 \qquad \text{(Equation 1)}$$

Note that "Dr" is diameter of the recess, "R" is distance from the light emitting element to the recess, and is deviation angle of the recess relative to the optical axis of the light emitting element (refer to FIG. 17), while "k1", "k2", "n" and "m" are constants.

By changing the size of each of the recesses 245c, 246c based on Equation 1, light energy emitted from each of the recesses 245c, 246c can be adjusted. Note that it is also possible to adjust the light energy emitted from each of the recesses 245c, 246c by keeping the size of the recess constant and changing the number of recesses per unit area based on Equation 1. In other words, the number of recesses 245c in the reflecting surface of the first light scattering region 245b and the number of recesses 246c in the reflecting surface of the second light scattering region 246b per unit area can be increased as the deviation angles of the recesses 245c, 246c relative to the optical axes LA of the light emitting elements 22 increase. In this case, "Dr" in the above Equation 1 corresponds to the number of recesses per unit area. Thus, like the case of changing the size of the recesses 245c, 246c, the case of changing the number of recesses 245, 246c per unit area also leads to changing the area occupation ratio of the recesses 245c in the reflecting surface of the first light scattering region 245b and the recesses 246c in the reflecting surface of the second light scattering region 246b.

The provision of the recesses 245c, 246c as described above can also eliminate the difference in luminance between regions closer to and regions farther from the light emitting elements 22, and reduce the luminance unevenness. Note that as described in each of the above embodiments, the light scattering treatment applied to the first light scattering region 245b and the second light scattering region 246b is not limited to the provision of the recesses in the reflecting area, and can be a provision of projections in the reflecting surface. This case can be achieved by allowing the area occupation ratio of the projections in the reflecting surface of the first light scattering region 245b and the projections in the reflecting surface of the second scattering region 246b to increase as the deviation angles of the projections relative to the optical axes LA of the light emitting elements 22 increase. The method to increase the area occupation ratio of the projections can be a method to make the projections larger (deeper), or can be a method to increase the number of projections per unit area. In addition, the light scattering treatment applied to the first light scattering region 245b and the second light scattering region 246b can be to provide both of the recesses and the projections in the reflecting surface. This case can be achieved by allowing the area occupation ratio of the recesses and the projections in the reflecting surface of the first light scattering region 245b and the recesses and the projections in the reflecting surface of the second scattering region 246b to increase as the deviation angles of the recesses and the projections relative to the optical axes LA of the light emitting elements 22 increase. The method to increase the area occupation ratio of the recesses and the projections can be a method to make the recesses and the projections larger (deeper), or can be a method to increase the number of recesses and projections per unit area.

Note that the components shown in FIG. 17 with reference numerals 233b, 241 a, 245, 245a, 246, 246a, 260 correspond to the inner peripheral surface 33b, the front side surface 41a of the annular part 41, the first reflecting part 45, the front side surface 45a of the first reflecting part 45, the second reflecting part 46, the front side surface 46a of the second reflecting part 46, and the element housing groove 60, in the first embodiment, respectively.

(Others)

The present invention has been described above using the embodiments and the modified example, but the present invention is not limited to the embodiments and the modified example described above. For example, the embodiment and the modified example described above can be formed by appropriately combining them in partial structures. Further, the materials, the numerical values and the like that are illustrated and described in the above embodiments are only preferable ones, and are not limited thereto. In addition, the structure of the present invention can be appropriately changed without departing from the scope of the technical concept of the present invention.

The present application is based on Japanese Patent Application 2013-106755 filed May 21, 2013, the content of which is incorporated herein by reference.

INDUSTRIAL APPLICABILITY

The illumination device according to the present invention can be widely used for lighting use in general such as a ceiling light, a down light, a back light and the like.

DESCRIPTION OF THE REFERENCE NUMERALS 1, 100 Illumination device
21, 121 Substrate
21a, 121a Element mounting surface
22 Light emitting element
30 Reflecting member
30a, 230a Inner reflecting member
30b, 230b Outer reflecting member 31a, 32a Light reflecting surface of inner reflecting member
31b, 32b Light reflecting surface of outer reflecting member
33a, 233a Outer peripheral surface of inner reflecting member
33b, 233b Inner peripheral surface of outer reflecting member
40, 140, 240 Light guide plate
41, 141 Annular part
42, 142 Annular inner part
42b, 142b Surface (third light scattering region)
43 Annular outer part
44, 144 Element array-facing part
44b, 144b Incident surface
45, 245 First reflecting part (inner reflecting part)
45a, 145a, 245a Surface
45b, 145b, 245b First light scattering region
46, 246 Second reflecting part (outer reflecting part)
46a, 246a Surface
46b, 246b Second light scattering region
45c, 46c, 145c, 245c, 246c Recess
60, 160 Element housing groove
145 Light reflecting part
θ Deviation angle

The invention claimed is:

1. An illumination device comprising:
a light guide plate; and
multiple light emitting elements annularly arranged on a back side of the light guide plate,
wherein the light guide plate comprises:
an element array-facing part which is a part facing an element array of the multiple light emitting elements and which has an incident surface to allow light emitted from the light emitting elements to enter; an outer annular outer part provided on an annular outside of the element array-facing part;
an inner reflecting part which is located on an inner side of the element array-facing part and has a reflecting surface for reflecting the light entering from the incident surface toward the inner side of the element array-facing part, and which has a first light scattering region having a light scattering treatment applied thereto; and
an annular inner part formed on an inner side of the inner reflecting part continuously with the inner reflecting part, the annular inner part, the inner guide part and the annular outer part comprise a solid light guide plate.

2. The illumination device according to claim 1, wherein the light scattering treatment applied to the first light scattering region is to provide recesses and/or projections in the reflecting surface of the inner reflecting part.

3. The illumination device according to claim 2, wherein the number of the recesses and/or projections per unit area in the reflecting surface of the first light scattering region increases as they get farther from the light emitting elements.

4. The illumination device according to claim 2, wherein the number of the recesses and/or projections per unit area in the reflecting surface of the first light scattering region increases as deviation angles of the recesses and/or projections relative to axes of the light emitting elements increase.

5. The illumination device according to claim 2, wherein an area occupation ratio of the recesses and/or projections in the reflecting surface of the first light scattering region increases as they get farther from the light emitting elements.

6. The illumination device according to claim 2, wherein an area occupation ratio of the recesses and/or projections in the reflecting surface of the first light scattering region increases as deviation angles of the recesses and/or projections relative to axes of the light emitting elements increase.

7. The illumination device according to claim 2, wherein the inner annular part comprises a third light scattering region having a light scattering treatment applied thereto, while recesses and/or projections are provided in the third light scattering region, and
wherein an area occupation ratio of the recesses and/or projections in the first light scattering region and the third light scattering region has a tendency to increase from the first light scattering region toward the third light scattering region.

8. The illumination device according to claim 7, wherein in the increase in the area occupation ratio of the recesses and/or projections from the first light scattering region toward the third light scattering region, there is a discontinuity between the first light scattering region and the third light scattering region.

9. The illumination device according to one of claim 1, wherein the light guide plate further comprises an outer reflecting part which is a part located closer to the annular outer part than the element array-facing part and which has a reflecting surface for reflecting the light entering from the incident surface toward the annular outer part, and
wherein the outer reflecting part comprises a second light scattering region having a light scattering treatment applied thereto.

10. The illumination device according to claim 9, wherein the light scattering treatment applied to the second light scattering region is to provide recesses and/or projections in a reflecting surface of the outer reflecting part.

11. The illumination device according to claim 10, wherein the number of the recesses and/or projections per unit area in the reflecting surface of the second light scattering region increases as they get farther from the light emitting elements.

12. The illumination device according to claim 10, wherein the number of the recesses and/or projections per unit area in the reflecting surface of the second light scattering region increases as deviation angles of the recesses and/or projections relative to axes of the light emitting elements increase.

13. The illumination device according to claim 10, wherein an area occupation ratio of the recesses and/or projections in the reflecting surface of the second light scattering region increases as they get farther from the light emitting elements.

14. The illumination device according to claim 10, wherein an area occupation ratio of the recesses and/or projections in the reflecting surface of the second light scattering region increases as deviation angles of the recesses and/or projections relative to axes of the light emitting elements increase.

* * * * *

UNITED STATES PATENT AND TRADEMARK OFFICE
CERTIFICATE OF CORRECTION

PATENT NO. : 9,557,465 B2  
APPLICATION NO. : 14/763269  
DATED : January 31, 2017  
INVENTOR(S) : Kadoriku et al.

Page 1 of 1

It is certified that error appears in the above-identified patent and that said Letters Patent is hereby corrected as shown below:

In the Claims

Column 23, Lines 36-37 (Claim 1) please change "an outer annular outer part" to -- an annular outer part --

Column 23, Line 48 (Claim 1) please change "the inner guide part" to -- the inner reflecting part --

Signed and Sealed this  
Fifteenth Day of August, 2017

Joseph Matal  
*Performing the Functions and Duties of the*  
*Under Secretary of Commerce for Intellectual Property and*  
*Director of the United States Patent and Trademark Office*